(12) United States Patent
Faxér et al.

(10) Patent No.: US 10,998,949 B2
(45) Date of Patent: May 4, 2021

(54) MULTI-BEAM CODEBOOKS WITH FURTHER OPTIMIZED OVERHEAD

(71) Applicant: Telefonaktiebolaget LM Ericsson (publ), Stockholm (SE)

(72) Inventors: Sebastian Faxér, Järfälla (SE); Shiwei Gao, Nepean (CA); Stephen Grant, Pleasanton, CA (US); Robert Mark Harrison, Grapevine, TX (US); Siva Muruganathan, Stittsville (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/594,555

(22) Filed: Oct. 7, 2019

(65) Prior Publication Data

US 2020/0036418 A1  Jan. 30, 2020

Related U.S. Application Data

(63) Continuation of application No. 15/759,400, filed as application No. PCT/IB2017/054911 on Aug. 11, 2017, now Pat. No. 10,484,059.

(Continued)

(51) Int. Cl.
*H04B 7/0456* (2017.01)
*H04B 7/06* (2006.01)
*H04B 7/0452* (2017.01)

(52) U.S. Cl.
CPC ......... *H04B 7/0478* (2013.01); *H04B 7/0452* (2013.01); *H04B 7/0456* (2013.01);
(Continued)

(58) Field of Classification Search
CPC .. H04B 7/0478; H04B 7/0452; H04B 7/0456; H04B 7/0617; H04B 7/063; H04B 7/0639; H04B 7/066
See application file for complete search history.

(56) References Cited

U.S. PATENT DOCUMENTS 9,287,958 B2   3/2016   Son et al.
9,331,767 B1   5/2016   Thomas et al.
(Continued)

FOREIGN PATENT DOCUMENTS

CN   104025657 A   9/2014
EP   1 423 926 A1   6/2004
(Continued)

OTHER PUBLICATIONS

3GPP TS 36.211 V13.0.0 3rd Generation Partnership Project; Technical Specification Group Radio Access Network; Evolved Universal Terrestrial Radio Access (E-UTRA); Physical Channels and Modulation (Release 13) (Dec. 2015) consisting of 141 pages.

(Continued)

*Primary Examiner* — Janice N Tieu
(74) *Attorney, Agent, or Firm* — Christopher & Weisberg, P.A.

(57) ABSTRACT

A method, wireless device and network node for determining an indication of a precoder are provided. According to one aspect, a method in a wireless device includes determining and the indication of the precoder from a codebook, the indication comprising a first beam phase parameter and a second beam phase parameter corresponding to a first beam and a second beam respectively. The first beam phase parameter takes on one of a first integer number of phase values and the second beam phase parameter takes on one of a second integer number of phase values. At least one of the following conditions apply: the second integer number of phase values is less than the first number of phase values, and the second frequency-granularity is greater than the first frequency-granularity. The method includes transmitting the determined indication of a precoder to the network node.

23 Claims, 14 Drawing Sheets

Related U.S. Application Data

(60) Provisional application No. 62/374,564, filed on Aug. 12, 2016.

(52) U.S. Cl.
CPC .............. *H04B 7/063* (2013.01); *H04B 7/066* (2013.01); *H04B 7/0617* (2013.01); *H04B 7/0639* (2013.01)

(56) References Cited

U.S. PATENT DOCUMENTS

| | | |
|---|---|---|
| 2002/0187814 A1 | 12/2002 | Yoshida |
| 2004/0042427 A1 | 3/2004 | Hottinen |
| 2010/0046667 A1 | 2/2010 | Tsutsui |
| 2011/0026418 A1 | 2/2011 | Bollea et al. |
| 2011/0050489 A1 | 3/2011 | Maenpa et al. |
| 2011/0069773 A1 | 3/2011 | Doron et al. |
| 2011/0305263 A1 | 12/2011 | Jongren et al. |
| 2012/0033566 A1 | 2/2012 | Porat et al. |
| 2013/0064129 A1* | 3/2013 | Koivisto .............. H04B 7/0621 370/252 |
| 2013/0107915 A1 | 5/2013 | Benjebbour et al. |
| 2013/0163457 A1 | 6/2013 | Kim et al. |
| 2013/0182787 A1 | 7/2013 | Kakishima et al. |
| 2013/0201912 A1 | 8/2013 | Sheng et al. |
| 2013/0308715 A1 | 11/2013 | Nam et al. |
| 2013/0343215 A1 | 12/2013 | Li et al. |
| 2014/0003240 A1 | 1/2014 | Chen et al. |
| 2014/0037029 A1 | 2/2014 | Murakami et al. |
| 2014/0050280 A1 | 2/2014 | Stirling-Gallacher et al. |
| 2014/0146863 A1 | 5/2014 | Seol et al. |
| 2014/0226611 A1 | 8/2014 | Kang et al. |
| 2014/0301492 A1 | 10/2014 | Xin et al. |
| 2014/0334564 A1 | 11/2014 | Singh et al. |
| 2015/0049702 A1 | 2/2015 | Cheng et al. |
| 2015/0078191 A1 | 3/2015 | Jongren et al. |
| 2015/0207547 A1 | 7/2015 | Ko et al. |
| 2015/0222340 A1 | 8/2015 | Nagata et al. |
| 2015/0315189 A1 | 11/2015 | Ametamey et al. |
| 2015/0326285 A1 | 11/2015 | Zirwas et al. |
| 2015/0381253 A1 | 12/2015 | Kim et al. |
| 2016/0013838 A1 | 1/2016 | Zhu et al. |
| 2016/0072562 A1 | 3/2016 | Onggosanusi et al. |
| 2016/0127021 A1 | 5/2016 | Noh et al. |
| 2016/0142117 A1 | 5/2016 | Rahman et al. |
| 2016/0156401 A1 | 6/2016 | Onggosanusi et al. |
| 2016/0173180 A1 | 6/2016 | Cheng et al. |
| 2016/0192383 A1 | 6/2016 | Hwang et al. |
| 2016/0323022 A1 | 11/2016 | Rahman et al. |
| 2016/0352012 A1 | 12/2016 | Foo |
| 2017/0134080 A1 | 5/2017 | Rahman et al. |
| 2017/0134082 A1 | 5/2017 | Onggosanusi et al. |
| 2017/0238323 A1 | 8/2017 | Marinier et al. |
| 2017/0311187 A1 | 10/2017 | Dong et al. |
| 2018/0034519 A1* | 2/2018 | Rahman .............. H04B 7/0456 |
| 2018/0131420 A1 | 5/2018 | Faxer et al. |
| 2018/0191411 A1 | 7/2018 | Faxer et al. |
| 2018/0219605 A1 | 8/2018 | Davydov et al. |
| 2019/0036584 A1 | 1/2019 | Chang et al. |
| 2019/0053220 A1 | 2/2019 | Zhang et al. |

FOREIGN PATENT DOCUMENTS

| | | |
|---|---|---|
| KR | 10-2016-0029503 A | 3/2016 |
| WO | 2015060548 A1 | 4/2015 |
| WO | 2015/147814 A1 | 10/2015 |
| WO | 2015/190866 A1 | 12/2015 |
| WO | 2016/048223 A1 | 3/2016 |
| WO | 2016/080742 A1 | 5/2016 |
| WO | 2016/120443 A1 | 8/2016 |
| WO | 2017/168349 A1 | 10/2017 |

OTHER PUBLICATIONS

3GPP TS 36.212 V8.8.0 3rd Generation Partnership Project; Technical Specification Group Radio Access Network; Evolved Universal Terrestrial Radio Access (E-UTRA); Multiplexing and Channel Coding (Release 8) (Dec. 2009), consisting of 60 pages.

3GPP TS 36.212 V13.0.0 3rd Generation Partnership Project; Technical Specification Group Radio Access Network; Evolved Universal Terrestrial Radio Access (E-UTRA); Multiplexing and Channel Coding (Release 13) (Dec. 2015), consisting of 121 pages.

3GPP TS 36.212 V13.2.0 3rd Generation Partnership Project; Technical Specification Group Radio Access Network; Evolved Universal Terrestrial Radio Access (E-UTRA); Multiplexing and Channel Coding (Release 13) (Jun. 2016), consisting of 140 pages.

3GPP TS 36.213 V13.0.1 3rd Generation Partnership Project; Technical Specification Group Radio Access Network; Evolved Universal Terrestrial Radio Access (E-UTRA); Physical Layer Procedures (Release 13) (Jan. 2016), consisting of 326 pages.

3GPP TS 36.214 V13.2.0 3rd Generation Partnership Project; Technical Specification Group Radio Access Network; Evolved Universal Terrestrial Radio Access (E-UTRA); Physical Layer; Measurements (Release 13) (Jun. 2016), consisting of 19 pages.

3GPP TS 36.321 V13.0.0 3rd Generation Partnership Project; Technical Specification Group Radio Access Network; Evolved Universal Terrestrial Radio Access (E-UTRA); Medium Access Control (MAC) Protocol Specification (Release 13) (Dec. 2015), consisting of 82 pages.

3GPP TS 36.321 V13.2.0 3rd Generation Partnership Project; Technical Specification Group Radio Access Network; Evolved Universal Terrestrial Radio Access (E-UTRA); Medium Access Control (MAC) Protocol Specification (Release 13) (Jun. 2016), consisting of 91 pages.

3GPP TS 36.331 V13.1.0 3rd Generation Partnership Project; Technical Specification Group Radio Access Network; Evolved Universal Terrestrial Radio Access (E-UTRA); Radio Resource Control (RRC); Protocol Specification (Release 13) (Mar. 2016), consisting of 551 pages.

3GPP TS 36.331 V13.0.0 3rd Generation Partnership Project; Technical Specification Group Radio Access Network; Evolved Universal Terrestrial Radio Access (E-UTRA); Radio Resource Control (RRC); Protocol Specification (Release 13) (Dec. 2015), consisting of 507 pages.

Rahman et al., "Linear Combination Codebook Based CSI Feedback Scheme for FD-MIMO Systems" IEEE 2015, consisting of 6 pages.

3GPP TSG-RAN WG1 #82, R1-154557, Source: Ericsson; Beijing, China, Aug. 24-28, 2015; FD-MIMO Codebook Structure, Design Features, and Dimensioning; Agenda Item: 7.2.5.3.1, Document for Discussion and Decision, consisting of 8 pages.

3GPP TSG RAN WG1 Meeting #85, R1-164777; Source: Samsung; Nanjing, China, May 23-27, 2016; "Hybrid PMI Codebook Based CSI Reporting and Simulation Results"; Agenda Item: 6.2.3.2.2, Document for Discussion and Decision, consisting of 8 pages.

3GPP TSG-RAN WG1 #85, R1-165100; Source: Ericsson, Nanjing, China, May 23-27, 2016; "High Resolution CSI Feedback"; Agenda Item: 6.2.3.2.3, Document for Discussion and Decision, consisting of 8 pages.

3GPP TSG RAN Meeting #71, RP-160623; Source: Samsung, Goteborg, Sweden, Mar. 7-10, 2016; "New WID Proposal: Enhancements on Full-Dimension (FD) MIMO for LTE", Agenda Item: 10.1.1, Document for: Approval, consisting of 8 pages.

LTE; Evolved Universal Terrestrial Radio Access (E-UTRA); Physical Layer Procedures, 3GPP TS 36.213 Version 13.2.0 Release 13 (Aug. 2016), consisting of 383 pages.

Invitation to Pay Additional Fees and, Where Applicable, Protest Fee dated Jan. 23, 2018 issued in corresponding PCT Application Serial No. PCT/IB2017/054910, consisting of 17 pages.

(56) References Cited

OTHER PUBLICATIONS

International Search Report and Written Opinion issued by the International Searching Authority dated Apr. 12, 2018 issued in PCT Application No. PCT/IB2017/054910, consisting of 18 pages.
International Preliminary Report on Patentability dated Feb. 21, 2019 issued in PCT Application No. PCT/IB2017/054910, consisting of 14 pages.
Invitation to Pay Additional Fees and, Where Applicable, Protest Fee dated Nov. 17, 2017 issued in corresponding PCT Application Serial No. PCT/IB2017/054911, consisting of 13 pages.
International Search Report and Written Opinion issued by the International Searching Authority dated Feb. 12, 2018 issued in PCT Application No. PCT/IB2017/054911, consisting of 24 pages.
International Preliminary Report on Patentability dated Nov. 22, 2018 issued in PCT Application No. PCT/IB2017/054911, consisting of 34 pages.
International Search Report and Written Opinion issued by the International Searching Authority dated Nov. 27, 2017 issued in PCT Application No. PCT/IB2017/054912, consisting of 9 pages.
Written Opinion of the International Preliminary Examining Authority dated Aug. 6, 2018 issued in PCT Application No. PCT/IB2017/054912, consisting of 6 pages.
International Preliminary Report on Patentability dated Nov. 7, 2018 issued in PCT Application No. PCT/IB2017/054912, consisting of 46 pages.
International Search Report and Written Opinion issued by the International Searching Authority dated Nov. 30, 2017 issued in PCT Application No. PCT/IB2017/054913, consisting of 9 pages.
Written Opinion of the International Preliminary Examining Authority dated Jul. 11, 2018 issued in PCT Application No. PCT/IB2017/054913, consisting of 6 pages.
International Preliminary Report on Patentability dated Nov. 20, 2018 issued in PCT Application No. PCT/IB2017/054913, consisting of 46 pages.
Non-Final Rejection dated Jun. 24, 2019 issued in U.S. Appl. No. 15/757,165, consisting of 37 pages.
Non-Final Rejection dated May 16, 2019 issued in U.S. Appl. No. 15/758,604, consisting of 27 pages.
Non-Final Rejection dated May 3, 2019 issued in U.S. Appl. No. 15/759,063, consisting of 24 pages.
Non-Final Rejection dated Mar. 18, 2019 issued in U.S. Appl. No. 15/759,400, consisting of 42 pages.
Final Office Action dated Dec. 16, 2019 issued in U.S. Appl. No. 15/757,165, consisting of 14 pages.
Final Office Action dated Nov. 27, 2019 issued in U.S. Appl. No. 15/758,604, consisting of 14 pages.
Final Office Action dated Oct. 10, 2019 issued in U.S. Appl. No. 15/759,063, consisting of 16 pages.
Non-Final Office Action dated Jul. 6, 2020 issued in U.S. Appl. No. 15/758,604, consisting of 8 pages.
Japanese Office Action and English Summary thereof dated Jun. 26, 2020 issued in corresponding Japanese Patent Application No. 2019-507778, consisting of 9 pages.
Korean Office Action and English translation thereof dated Jul. 20, 2020 issued in corresponding Korean Patent Application No. 10-2019-7007214, consisting of 7 pages.
Indian Examination Report dated Aug. 18, 2020 and English translation thereof issued in Indian Patent Application No. 201937004361, consisting of 6 pages.
European Examination Report dated Aug. 14, 2020 issued in European Patent Application No. 17 767 929.7, consisting of 8 pages.
Final Office Action dated Oct. 22, 2020 issued in U.S. Appl. No. 15/757,165, consisting of 18 pages.
Chinese First Office Action and Search Report dated Dec. 25, 2020 issued in Chinese Patent Application No. 201780063472.3, consisting of 39 pages.
Chinese First Office Action and Search Report dated Dec. 11, 2020 issued in Chinese Patent Application No. 201780063408.5, consisting of 24 pages.
Indian Examination Report dated Jan. 20, 2021 issued in Indian Application No. 201937004366, consisting of 6 pages.
European Examination Report dated Jan. 29, 2021 issued in corresponding European Patent Application No. 17 767 929.7, consisting of 7 pages.
R1-154557; Ericsson: "FD-MIMO codebook structure, design features, and dimensioning", vol. RAN WGI , No. Beijing, China; Aug. 24, 2015-Aug. 28, 2015 Aug. 24-28, 2015 (Aug. 24, 2015), consisting of 8 pages.
R1-164777; Samsung: "Hybrid PMI codebook based CSI reporting and simulation results", vol. RAN WGI , No. Nanjing, China; May 23, 2016-May 27, 2016 May 23-27, 2016 (May 23, 2016); consisting of 8 pages.

* cited by examiner

PRECODER ELEMENTS TO ANTENNA PORT MAPPING EXAMPLE: (N1,N2)=(4,2)

MULTI-BEAM CODEBOOKS WITH FURTHER OPTIMIZED OVERHEAD

CROSS-REFERENCE TO RELATED APPLICATION

This application is a continuation of and claims priority to U.S. patent application Ser. No. 15/759,400, filed Mar. 12, 2018, entitled "MULTI-BEAM CODEBOOKS WITH FURTHER OPTIMIZED OVERHEAD," which claims priority to International Application No. PCT/IB2017/054911, filed Aug. 11, 2017, entitled "MULTI-BEAM CODEBOOKS WITH FURTHER OPTIMIZED OVERHEAD," which claims priority to U.S. Provisional Application No. 62/374,564, filed Aug. 12, 2016 entitled "MULTI-BEAM CODEBOOKS WITH FURTHER OPTIMIZED OVERHEAD," the entireties of all of which are incorporated herein by reference.

TECHNICAL FIELD

This disclosure relates to wireless communications, and in particular, multi-beam codebooks having an optimized overhead.

BACKGROUND

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The 3GPP long term evolution (LTE) standard is currently evolving with enhanced MIMO support. A core component in LTE is the support of MIMO antenna deployments and MIMO related techniques. Currently LTE-Advanced supports an 8-layer spatial multiplexing mode for up to 16 transmit antennas with channel dependent precoding. The spatial multiplexing mode is aimed for high data rates in favorable channel conditions. An illustration of the spatial multiplexing operation by a precoding matrix 2 is provided in FIG. 1.

As seen, the information carrying symbol vector s from layers 1-r 4 is multiplied by an $N_T \times r$ precoder matrix W, 2 which serves to distribute the transmit energy in a subspace of the $N_T$ (corresponding to $N_T$ antenna ports) dimensional vector space to produce signals to be inverse Fourier transformed 6.

The precoder matrix 2 is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

LTE uses OFDM in the downlink (and DFT precoded OFDM in the uplink) and hence the received $N_R \times 1$ vector $y_n$ for a certain TFRE on subcarrier n (or alternatively data TFRE number n) is thus modeled by $$y_n = H_n W s_n + e_n \qquad \text{Equation 1}$$

where $e_n$ is a noise/interference vector obtained as realizations of a random process. The precoder W can be a wideband precoder, which is constant over frequency, or frequency selective.

The precoder matrix W 2 is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the wireless device. In addition, the precoder matrix may also be selected to strive for orthogonalizing the channel, meaning that after proper linear equalization at the wireless device, the inter-layer interference is reduced.

One example method for a wireless device to select a precoder matrix W can be to select the $W_k$ that maximizes the Frobenius norm of the hypothesized equivalent channel:

$$\max_k \|\hat{H}_n W_k\|_F^2 \qquad \text{Equation 2}$$

Where
$\hat{H}_n$ is a channel estimate, possibly derived from CSI-RS as described later.
$W_k$ is a hypothesized precoder matrix with index k.
$\hat{H}_n W_k$ is the hypothesized equivalent channel.

In closed-loop precoding for the LTE downlink, the wireless device transmits, based on channel measurements in the forward link (downlink), recommendations to the base station, e.g., eNodeB (eNB) of a suitable precoder to use. The base station configures the wireless device to provide feedback according to the wireless device's transmission mode, and may transmit CSI-RS and configure the wireless device to use measurements of CSI-RS to feedback recommended precoding matrices that the wireless device selects from a codebook. A single precoder that is supposed to cover a large bandwidth (wideband precoding) may be fed back. It may also be beneficial to match the frequency variations of the channel and instead feedback a frequency-selective precoding report, e.g., several precoders, one per subband. This is an example of the more general case of channel state information (CSI) feedback, which also encompasses feeding back other information that recommended precoders to assist the eNodeB in subsequent transmissions to the wireless device. Such other information may include channel quality indicators (CQIs) as well as transmission rank indicator (RI).

In LTE, the format of the CSI reports is specified in detail and may contain CQI (Channel-Quality Information), Rank Indicator (RI), and Precoding Matrix Indicator (PMI). The reports can be wideband (i.e. applicable to the whole bandwidth) or subbands (i.e. applicable to part of the bandwidth). They can be configured by a radio resource control (RRC) message to be sent periodically or in an aperiodic manner triggered by a DCI sent from the eNB to a WD. The quality and reliability of the CSI are crucial for the eNB in order to make the best possible scheduling decisions for the upcoming DL transmissions.

An aperiodic CSI request is indicated in the CSI request field in DCI format 0 or DCI format 4. The number of bits in the field varies from 1 bit to 3 bits, depending on WD configuration. For example, for WDs configured with 1 to 5 carriers (or cells) and/or multiple CSI-RS processes, 2 bits are used, and for WDs configured with more than 5 carriers, 3 bits are used. In case a WD is configured with a single carrier (i.e. serving cell c) and 2 sets of CSI-RS processes, the CSI request field is shown in Table 1. If a WD is configured with a single carrier and a single or no CSI process, a single bit is used. The concept of CSI process was introduced in LTE Rel-11, where a CSI process is defined as a configuration of a channel measurement resource and an interference measurement resource and up to four CSI processes can be configured for a WD.

TABLE 1

| Value of CSI request field | Description |
| --- | --- |
| '00' | No aperiodic CSI report is triggered |
| '01' | Aperiodic CSI report is triggered for a set of CSI process(es) configured by higher layers for serving cell$_c$ |
| '10' | Aperiodic CSI report is triggered for a $1^{st}$ set of CSI process(es) configured by higher layers |
| '11' | Aperiodic CSI report is triggered for a $2^{nd}$ set of CSI process(es) configured by higher layers |

With regard to CSI feedback, a subband is defined as a number of adjacent PRB pairs. In LTE, the subband size (i.e., the number of adjacent PRB pairs) depends on the system bandwidth, whether CSI reporting is configured to be periodic or aperiodic, and feedback type (i.e., whether higher layer configured feedback or wireless device-selected subband feedback is configured). An example illustrating the difference between subband and wideband is shown in FIG. 2. In the example, the subband consists of 6 adjacent PRBs. Note that only 2 subbands are shown in FIG. 2 for simplicity of illustration. Generally, all the PRB pairs in the system bandwidth are divided into different subbands where each subband consists of a fixed number of PRB pairs.

In contrast, the wideband CSI feedback involves all the PRB pairs in the system bandwidth. As mentioned above, a wireless device may feedback a single precoder that takes into account the measurements from all PRB pairs in the system bandwidth if it is configured to report wideband PMI by the base station. Alternatively, if the wireless device is configured to report subband PMI, a wireless device may feedback multiple precoders with one precoder per subband. In addition, to the subband precoders, the wireless device may also feedback the wideband PMI.

In LTE, two types of subband feedback types are possible for PUSCH CSI reporting: (1) higher layer configured subband feedback and (2) wireless device selected subband feedback. With higher layer configured subband feedback, the wireless device may feedback PMI and/or CQI for each of the subbands. The subband size in terms of the number of PRB pairs for higher layer configured subband feedback is a function of system bandwidth and is listed in Table 2.

With wireless device selected subband feedback, the wireless device only feeds back PMI and/or CQI for a selected number of subbands out of all the subbands in the system bandwidth. The subband size in terms of the number of PRB pairs and the number of subbands to be fed back are a function of the system bandwidth and are listed in Table 3.

TABLE 2

| System Bandwidth $N_{RB}$ | Subband Size ($k_{sub}$) |
| --- | --- |
| 6-7 | NA |
| 8-10 | 4 |
| 11-26 | 4 |

TABLE 2-continued

| System Bandwidth $N_{RB}$ | Subband Size ($k_{sub}$) |
| --- | --- |
| 27-63 | 6 |
| 64-110 | 8 |

TABLE 3

| System Bandwidth $N_{RB}^{DL}$ | Subband Size k (RBs) | Number of Subbands |
| --- | --- | --- |
| 6-7 | NA | NA |
| 8-10 | 2 | 1 |
| 11-26 | 2 | 3 |
| 27-63 | 3 | 5 |
| 64-110 | 4 | 6 |

Given the CSI feedback from the wireless device, the base station determines the transmission parameters it wishes to use to transmit to the wireless device, including the precoding matrix, transmission rank, and modulation and coding state (MCS). These transmission parameters may differ from the recommendations the wireless device makes. Therefore, a rank indicator and MCS may be signaled in downlink control information (DCI), and the precoding matrix can be signaled in DCI or the base station can transmit a demodulation reference signal from which the equivalent channel can be measured. The transmission rank, and thus the number of spatially multiplexed layers, is reflected in the number of columns of the precoder W. For efficient performance, it is important that a transmission rank that matches the channel properties is selected.

In LTE Release-10, a new reference signal was introduced to estimate downlink channel state information reference signals, (CSI-RS). The CSI-RS provides several advantages over basing the CSI feedback on the common reference signals (CRS) which were used for that purpose in Releases 8-9. First, the CSI-RS is not used for demodulation of the data signal, and thus does not require the same density (i.e., the overhead of the CSI-RS is substantially less). Second, CSI-RS provides a much more flexible means to configure CSI feedback measurements (e.g., which CSI-RS resource to measure on can be configured in a wireless device specific manner).

By measuring a CSI-RS transmitted from the base station, a wireless device can estimate the effective channel the CSI-RS is traversing including the radio propagation channel and antenna gains. In more mathematical rigor this implies that if a known CSI-RS signal x is transmitted, a wireless device can estimate the coupling between the transmitted signal and the received signal (i.e., the effective channel). Hence if no virtualization is performed in the transmission, the received signal y can be expressed as $$y=Hx+e \quad \text{Equation 3}$$

and the wireless device can estimate the effective channel H.

Up to eight CSI-RS ports can be configured in LTE Rel-10, that is, the wireless device can estimate the channel from up to eight transmit antenna ports. In LTE Release 13, the number of CSI-RS ports that can be configured is extended to up to sixteen ports. In LTE Release 14, supporting up to 32 CSI-RS ports is under consideration.

Related to CSI-RS is the concept of zero-power CSI-RS resources (also known as muted CSI-RS) that are configured just as regular CSI-RS resources, so that a wireless device knows that the data transmission is mapped around those resources. The intent of the zero-power CSI-RS resources is to enable the network to mute the transmission on the corresponding resources in order to boost the signal-to-interference-plus-noise ratio (SINR) of a corresponding non-zero power CSI-RS, possibly transmitted in a neighbor cell/transmission point. For Rel-11 of LTE a special zero-power CSI-RS was introduced that a wireless device is mandated to use for measuring interference plus noise. A wireless device can assume that the serving evolved node B (eNB) is not transmitting on the zero-power CSI-RS resource, and the received power can therefore be used as a measure of the interference plus noise.

Based on a specified CSI-RS resource and on an interference measurement configuration (e.g., a zero-power CSI-RS resource), the wireless device can estimate the effective channel and noise plus interference, and consequently also determine the rank, precoding matrix, and MCS to recommend to best match the particular channel.

Existing solutions for MU-MIMO based on implicit CSI reports with DFT-based precoders have problems with accurately estimating and reducing the interference between co-scheduled users, leading to poor MU-MIMO performance.

Multi-beam precoder schemes may lead to better MU-MIMO performance, but at the cost of increased CSI feedback overhead and wireless device precoder search complexity. It is an open problem of how an efficient multi-beam precoder codebook that results in good MU-MIMO performance but low feedback overhead should be constructed, as well as how the CSI feedback should be derived by the wireless device.

SUMMARY

Some embodiments advantageously provide a method, wireless device and network node for determining a granularity for precoder overhead optimization. According to one aspect, a method of determining a precoder from a multi-beam precoder codebook is provided. The method includes determining, for each beam, a granularity of a co-phasing factor, the granularity of a co-phasing factor for a beam being based on a beam strength, a weaker beam having a lower granularity than a stronger beam. The method also includes determining a co-phasing factor for each beam with the determined granularity. The method further includes transmitting co-phasing factors to a network node.

According to this aspect, in some embodiments, the method further includes transmitting the granularities to the network node. In some embodiments, a granularity of a co-phasing factor for a beam is based on a beam strength, a weaker beam having a lower granularity than a stronger beam. In some embodiments, the method further includes determining a frequency granularity of each beam to be a multiple of a subband size. In some embodiments, the method further includes determining a granularity of a phase shift keyed, PSK, constellation. In some embodiments, the PSK constellation is 8 PSK for beams having a beam strength above a first threshold and the PSK constellation is quadrature PSK (QPSK) for beams having a beam strength below a second threshold. In some embodiments, the first and second thresholds are the same. In some embodiments, the method further includes differentially encoding a phase of each a plurality of frequency subbands of a beam. In some embodiments, the method further includes comprising parametrically encoding a phase of a beam versus frequency of the beam.

According to another aspect, a wireless device is configured to determine a precoder from a multi-beam precoder codebook. The wireless device includes processing circuitry including a memory and a processor. The memory is configured to store co-phasing factors. The processor is configured to determine, for each beam, a granularity of a co-phasing factor, the granularity of a co-phasing factor for a beam being based on a beam strength, a weaker beam having a lower granularity than a stronger beam. The processor is also configured to determine a co-phasing factor for each beam with the determined granularity. The wireless device also includes a transceiver configured to transmit the co-phasing factors to a network node.

According to this aspect, in some embodiments, the processor is further configured to transmit the determined granularities to the network node. In some embodiments, the processor is further configured to determine a frequency granularity of each beam to be a multiple of a subband size.

In some embodiments, the processor is further configured to determine a granularity of a phase shift keyed, PSK, constellation. In some embodiments, the PSK constellation is 8 PSK for beams having a beam strength above a first threshold and the PSK constellation is quadrature PSK (QPSK) for beams having a beam strength below a second threshold. In some embodiments, the first and second thresholds are the same. In some embodiments, the processor is further configured to differentially encode a phase of each of a plurality of frequency subbands of a beam.

According to yet another aspect, a wireless device is configured to determine a precoder from a multi-beam precoder codebook. The wireless device includes a memory module configured to store co-phasing factors, a granularity determiner module configured to determine, for each beam, a granularity of a co-phasing factor, the granularity of a co-phasing factor, a granularity of a co-phasing factor for a beam being based on a beam strength, a weaker beam having a lower granularity than a stronger beam. The wireless device also includes a co-phase factor determiner module configured to determine a co-phasing factor for each beam with the determined granularity. The wireless device also includes a transceiver module configured to transmit the co-phasing factors to a network node.

According to yet another aspect, in some embodiments, a method for a wireless device of reporting a precoder to a network node is provided. The method includes determining from a codebook an indication of a precoder comprising a first beam phase parameter and a second beam phase parameter corresponding to a first beam and second beam, respectively. The first beam phase parameter takes on one of a first integer number of phase values and corresponds to a first frequency-granularity. The second beam phase parameter takes on one of a second integer number of phase values and corresponds to a second frequency-granularity. Further, at least one of the following conditions applies: the second integer number of phase values is less than the first number of phase values, and the second frequency-granularity is greater than the first frequency-granularity. The method includes determining an indication of the precoder, and transmitting the determined indication of the precoder to the network node. In some embodiments, the second beam has a lesser power than the first beam.

According to another aspect, in some embodiments, a method for a wireless device of reporting a precoder to a network node is provided. The method includes determining from a codebook an indication of a precoder comprising a first beam phase parameter and a second beam phase parameter corresponding to a first beam and second beam, respectively. The first beam phase parameter takes on one of a first integer number of phase values. The second beam phase parameter takes on one of a second integer number of phase values. The second beam has a lesser power than the first beam and the second integer number of phase values is less than the first integer number of phase values. The method also includes reporting the selected precoder to a network node.

In some embodiments, the method also includes determining the first and second integer number of phase values, and, optionally, transmitting the first and second integer number of phase values to the network node. In some embodiments, the method also includes determining a frequency-granularity of each beam to be a multiple of a subband size. In some embodiments, the first and second integer number of phase values are respective numbers of values attainable in a phase shift keyed, PSK, constellation. In some embodiments, each of the first and second beams is a $k^{th}$ beam, d(k), that is associated with a set of complex numbers and has index pair $(l_k, m_k)$, each element of the set of complex numbers being characterized by at least one complex phase shift such that:

$$d_n(k) = d_i(k) \alpha_{i,n} e^{j2\pi(p\Delta_{1,k} + q\Delta_{2,k})};$$

$d_n(k)$, and $d_i(k)$ are the $i^{th}$ and $n^{th}$ elements of d(k), respectively;

$\alpha_{i,n}$ is a real number corresponding to the $i^{th}$ and $n^{th}$ elements of d(k);

p and q are integers; and beam directions $\Delta_{1,k}$ and $\Delta_{2,k}$ are real numbers corresponding to beams with index pair $(l_k, m_k)$ that determine complex phase shifts $e^{j2\pi\Delta_{1,k}}$ and $e^{j2\pi\Delta_{2,k}}$ respectively; and each of the first and second beam phase parameters is a complex coefficient $c_k$ for d(k) used to adjust at least the phase of the $i^{th}$ element of d(k) according to $c_k d_i(k)$.

In some embodiments, the first and second integer number of phase values are respective granularities of respective co-phasing factors for the first and second beams. In some embodiments, the PSK constellation is 8 PSK for beams having a beam strength above a first threshold and the PSK constellation is quadrature PSK (QPSK) for beams having a beam strength below a second threshold. In some embodiments, the first and second thresholds are the same. In some embodiments, the method further includes differentially encoding at least one of the first and second beam phase parameters, wherein each of the first and second beam phase parameters corresponds to a plurality of frequency subbands. In some embodiments, a first plurality of first beam phase parameters and a second plurality of second beam phase parameters correspond to the first beam and second beam, respectively. Further the method may include parametrically encoding at least one of the first plurality and second plurality of first and second beam phase parameters, where the at least one of the first plurality and second plurality of beam phase parameters are coefficients within a predetermined function over frequency.

According to yet another aspect, in some embodiments, a wireless device is configured to transmit a precoder to a network node. The wireless device includes processing circuitry configured to determine from a codebook an indication of a precoder comprising a first beam phase parameter and a second beam phase parameter corresponding to a first beam and second beam, respectively. The first beam phase parameter takes on one of a first integer number of phase values and corresponds to a first frequency-granularity. The second beam phase parameter takes on one of a second integer number of phase values and corresponds to a second frequency-granularity, where at least one of the following conditions apply: the second integer number of phase values is less than the first number of phase values, and the second frequency-granularity is greater than the first frequency-granularity. The wireless device also includes a transceiver configured to transmit the determined indication of the precoder to the network node. In some embodiments, the second beam has a lesser power than the first beam.

In some embodiments, a wireless device is configured to transmit a precoder to a network node. The wireless device includes processing circuitry including a memory and a processor. The memory is configured to store beam phase parameters. The processor is configured to implement a beam phase parameter determiner to determine from a codebook an indication of a precoder comprising a first beam phase parameter and a second beam phase parameter corresponding to a first beam and second beam, respectively. The first beam phase parameter takes on one of a first integer number of phase values. The second beam phase parameter takes on one of a second integer number of phase values, the second beam having a lesser power than the first beam and the second integer number of phase values being less than the first integer number of phase values. The wireless device also includes a transceiver configured to transmit the selected precoder to a network node.

In some embodiments, the processor is further configured to determine the first and second integer number of phase values, and transmitting the first and second integer number of phase values to the network node. In some embodiments, the processor is further configured to determine a frequency-granularity of each beam to be a multiple of a subband size. In some embodiments, the first and second integer number of phase values are respective numbers of values attainable in a phase shift keyed, PSK, constellation. In some embodiments, each of the first and second beams is a $k^{th}$ beam, d(k), that has associated a set of complex numbers and has index pair $(l_k, m_k)$, each element of the set of complex numbers being characterized by at least one complex phase shift such that:

$$d_n(k) = d_i(k) \alpha_{i,n} e^{j2\pi(p\Delta_{1,k} + q\Delta_{2,k})};$$

$d_n(k)$, and $d_i(k)$ are the $i^{th}$ and $n^{th}$ elements of d(k), respectively;

$\alpha_{i,n}$ is a real number corresponding to the $i^{th}$ and $n^{th}$ elements of d(k);

p and q are integers; and beam directions $\Delta_{1,k}$ and $\Delta_{2,k}$ are real numbers corresponding to beams with index pair $(l_k, m_k)$ that determine complex phase shifts $e^{j2\pi\Delta_{1,k}}$ and $e^{j2\pi\Delta_{2,k}}$ respectively; and each of the first and second beam phase parameters is a complex coefficient $c_k$ for d(k) used to adjust at least the phase of the $i^{th}$ element of d(k) according to $c_k d_i(k)$.

In some embodiments, the first and second integer number of phase values are respective granularities of respective co-phasing factors for the first and second beams. In some embodiments, the PSK constellation is 8 PSK for beams having a beam strength above a first threshold and the PSK constellation is quadrature PSK (QPSK) for beams having a beam strength below a second threshold. In some embodiments, the first and second thresholds are the same. In some embodiments, the processor is further configured to differentially encode at least one of the first and second beam phase parameters, wherein each of the first and second beam phase parameters corresponds to a plurality of frequency subbands. In some embodiments, a first plurality of first beam phase parameters and a second plurality of second beam phase parameters correspond to the first beam and second beam, respectively. The processor is further configured to parametrically encode at least one of the first plurality and second plurality of first and second beam phase parameters, where the at least one of the first plurality and second plurality of beam phase parameters are coefficients within a predetermined function over frequency.

According to another aspect, in some embodiments, a wireless device includes a memory module configured to store beam phase parameters. The wireless device also includes a beam phase determiner module configured to determine first and second beam phase parameters corresponding to first and second beams, respectively. The first beam phase parameter takes on one of a first integer number of phase values. The second beam phase parameter taking on one of a second integer number of phase values, the second beam having a lesser power than the first beam and the second integer number of phase values being less than the first integer number of phase values. The wireless device also includes a transceiver module configured to transmit the selected precoder to a network node.

According to another aspect, a method in a network node for determining a precoder using a multi-beam precoder codebook is provided. The method includes receiving a first co-phasing factor determined for a first beam with a first frequency granularity, receiving a second co-phasing factor determined for a second beam with a second frequency granularity, the second frequency granularity being greater than the first frequency granularity, and determining a precoder using the first and second co-phasing factors.

According to this aspect, in some embodiments, the method includes determining a frequency granularity of a co-phasing factor for each of a plurality of beams, the frequency granularity of a co-phasing factor for a beam being based on a beam strength, a weaker beam having a lower frequency granularity than a stronger beam, and transmitting the frequency granularities to the wireless device. According to this aspect, in some embodiments, a frequency granularity of a co-phasing factor for a beam is based on a beam strength, a weaker beam having a lower frequency granularity than a stronger beam. In some embodiments, the method includes determining a frequency granularity of each beam to be a multiple of a subband size. In some embodiments, the method further includes determining a granularity of a phase shift keyed, PSK, constellation. In some embodiments, the PSK constellation is 8 PSK for beams having a beam strength above a threshold and the PSK constellation is quadrature PSK (QPSK) for beams having a beam strength below the threshold.

According to yet another aspect, a network node for determining a precoder using a multi-beam precoder codebook is provided. The network node includes processing circuitry including a memory and a processor. The memory is configured to store co-phasing factors for each of a plurality of beams. The processor is configured to receive a first co-phasing factor determined for a first beam with a first frequency granularity and receive a second co-phasing factor determined for a second beam with a second frequency granularity, the second frequency granularity being greater than the first frequency granularity. The processor is further configured to determine a precoder using the first and second co-phasing factors.

According to this aspect, in some embodiments the processor is configured to determine a frequency granularity of a co-phasing factor for each of a plurality of beams, a frequency granularity of a co-phasing factor for a beam being based on a beam strength, a weaker beam having a lower frequency granularity than a stronger beam, and. The network node further includes a transceiver configured to transmit the frequency granularities to a wireless device. According to this aspect, in some embodiments, the processor is further configured to determine a frequency granularity of each beam to be a multiple of a subband size. In some embodiments, the processor is further configured to determine a frequency granularity of a phase shift keyed, PSK, constellation. In some embodiments, the PSK constellation is 8 PSK for beams having a beam strength above a threshold and is quadrature PSK (QPSK) for beams having a beam strength below the threshold. In some embodiments, the processor is further configured to differentially encode a phase of each subband.

According to another aspect, a network node is configured to determine a precoder using a multi-beam precoder codebook. The network node includes a transceiver module configured to receive a first co-phasing factor determined for a first beam with a first frequency granularity and receive a second co-phasing factor determined for a second beam with a second frequency granularity, the second frequency granularity being greater than the first frequency granularity. The network node further includes a precoder module configured to determine a precoder using the first and second co-phasing factors.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
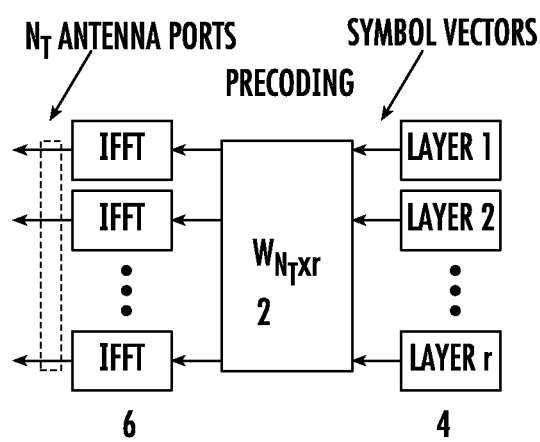
FIG. 1 is a block diagram of a system for spatial multiplexing.
Figure 2:
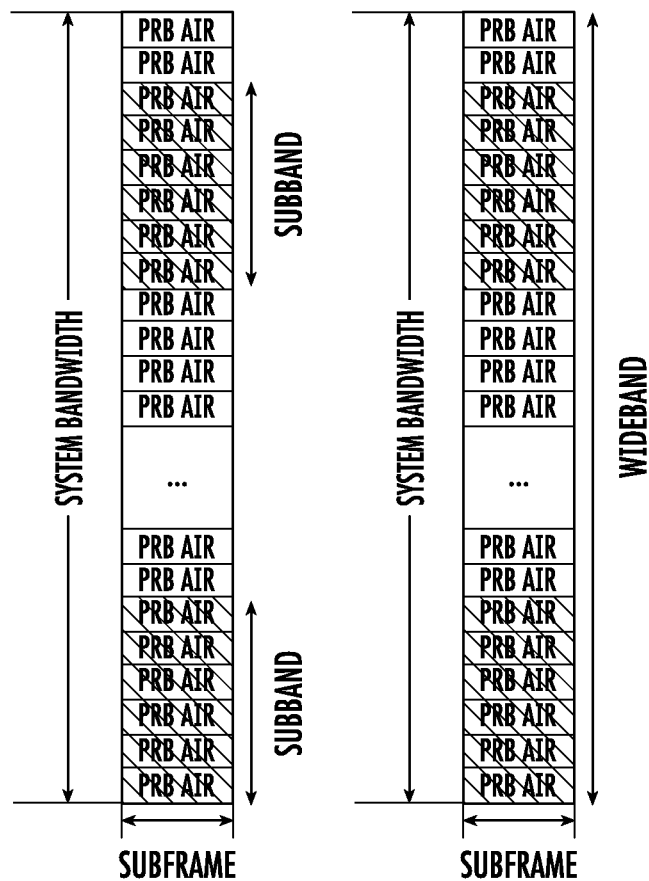
FIG. 2 is a diagram of partitioning of system bandwidth.

The term wireless device (WD) used herein may refer to any type of wireless device communicating with a network node and/or with another wireless device in a cellular or mobile communication system. Examples of a wireless device are a user equipment (UE), target device, device to device (D2D) wireless device, machine type wireless device or wireless device capable of machine to machine (M2M) communication, PDA, iPAD, Tablet, mobile terminals, smart phone, laptop embedded equipped (LEE), laptop mounted equipment (LME), USB dongles etc.

The term "network node" used herein may refer to a radio network node or another network node, e.g., a core network node, MSC, MME, O&M, OSS, SON, positioning node (e.g. E-SMLC), MDT node, etc.

The term "radio network node" used herein can be any kind of network node comprised in a radio network which may further comprise any of base station (BS), radio base station, base transceiver station (BTS), base station controller (BSC), radio network controller (RNC), evolved Node B (eNB or eNodeB), or 3GPP New Radio Node B, known as gNB, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

Note further that functions described herein as being performed by a wireless device or a network node may be distributed over a plurality of wireless devices and/or network nodes.

Before describing in detail exemplary embodiments, it is noted that the embodiments reside primarily in combinations of apparatus components and processing steps related to multi-beam codebooks with optimized overhead. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Some implementations use two dimensional antenna arrays. Such antenna arrays may be (partly) described by the number of antenna columns corresponding to the horizontal dimension $N_h$, the number of antenna rows corresponding to the vertical dimension $N_v$ and the number of dimensions corresponding to different polarizations $N_p$. The total number of antennas is thus $N=N_h N_v N_p$. It should be pointed out that the concept of an antenna is non-limiting in the sense that it can refer to any virtualization (e.g., linear mapping) of the physical antenna elements. For example, pairs of physical sub-elements could be fed the same signal, and hence share the same virtualized antenna port.

Figure 3:
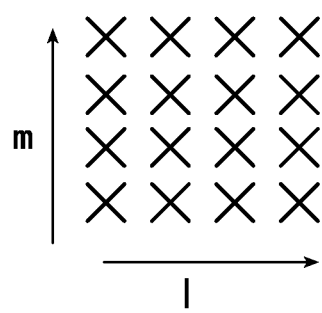
FIG. 3 is 4×4 array of dual-polarized antennas.

An example of a 4×4 (i.e. four rows by four columns) array with cross-polarized antenna elements is shown in FIG. 3.

Precoding may be interpreted as multiplying the signal with different beamforming weights for each antenna prior to transmission. A typical approach is to tailor the precoder to the antenna form factor, i.e. taking into account $N_h$, $N_v$ and $N_p$ when designing the precoder codebook. A common type of precoding is to use a DFT-precoder, where the precoder vector used to precode a single-layer transmission using a single-polarized uniform linear array (ULA) with $N_1$ antennas is defined as $$w_{1D}(l, N_1, O_1) = \frac{1}{\sqrt{N_1}} \begin{bmatrix} e^{j2\pi \cdot 0 \cdot \frac{l}{O_1 N_1}} \\ e^{j2\pi \cdot 1 \cdot \frac{l}{O_1 N_1}} \\ \vdots \\ e^{j2\pi \cdot (N_1-1) \cdot \frac{l}{O_1 N_1}} \end{bmatrix} \quad \text{Equation 4}$$

where $l=0, 1, \ldots O_1 N_1 - 1$ is the precoder index and $O_1$ is an integer oversampling factor. A precoder for a dual-polarized uniform linear array (ULA) with $N_1$ antennas per polarization (and so $2N_1$ antennas in total) can be similarly defined as $$w_{1D,DP}(l, N_1, O_1) = \begin{bmatrix} w_{1D}(l) \\ e^{j\phi} w_{1D}(l) \end{bmatrix} = \begin{bmatrix} w_{1D}(l) & 0 \\ 0 & w_{1D}(l) \end{bmatrix} \begin{bmatrix} 1 \\ e^{j\phi} \end{bmatrix} \quad \text{Equation 5}$$

where $e^{j\phi}$ is a co-phasing factor between the two polarizations that may for instance be selected from a QPSK alphabet $$\phi \in \left\{0, \frac{\pi}{2}, \pi, \frac{3\pi}{2}\right\}.$$

Figure 4:
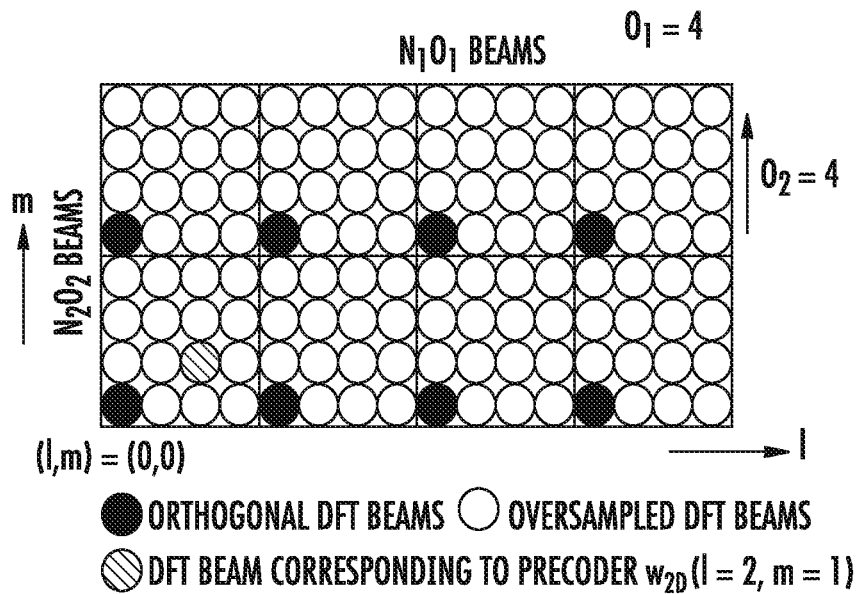
FIG. 4 is a grid of DFT beams.

A corresponding precoder vector for a two-dimensional uniform planar array (UPA) with $N_1 \times N_2$ antennas can be created by taking the Kronecker product of two precoder vectors as $w_{2D}(l,m) = w_{1D}(l, N_1, O_1) \otimes w_{1D}(m, N_2, O_2)$, where $O_2$ is an integer oversampling factor in the $N_2$ dimension. Each precoder $w_{2D}(l, m)$ forms a 2D DFT beam, all the precoders $\{w_{2D}(l, m), l=0, \ldots, N_1 O_1-1; m=0, \ldots, N_2 O_2-1\}$ form a grid of discrete Fourier transform (DFT) beams. An example is shown in FIG. 4 where $(N_1, N_2)=(4,2)$ and $(O_1, O_2)=(4,4)$. Each of the grid of DFT beams points to a spatial direction which can be described by an azimuth and elevation. For simplicity, throughout the following sections, the terms 'DFT beams' and 'DFT precoders' are used interchangeably, although 'precoders' are used to form 'beams'.

More generally, a beam with an index pair (l, m) can be identified by the direction in which the greatest energy is transmitted when precoding weights $w_{2D}(l, m)$ are used in the transmission. Also, a magnitude taper can be used with DFT beams to lower the beam's sidelobes, the beam pattern at directions away from the main beam. A 1D DFT precoder along $N_1$ and $N_2$ dimensions with magnitude tapering can be expressed as $$w_{1D}(l, N_1, O_1, \beta) = \frac{1}{\sqrt{N_1}} \begin{bmatrix} \beta_0 e^{j2\pi \cdot 0 \cdot \frac{l}{O_1 N_1}} \\ \beta_1 e^{j2\pi \cdot 1 \cdot \frac{l}{O_1 N_1}} \\ \vdots \\ \beta_{N_1-1} e^{j2\pi \cdot (N_1-1) \cdot \frac{l}{O_1 N_1}} \end{bmatrix}, \text{ and}$$

-continued $$w_{1D}(m, N_2, O_2, \gamma) = \frac{1}{\sqrt{N_2}} \begin{bmatrix} \gamma_0 e^{j2\pi \cdot 0 \cdot \frac{m}{O_2 N_2}} \\ \gamma_1 e^{j2\pi \cdot 1 \cdot \frac{m}{O_2 N_2}} \\ \vdots \\ \gamma_{N_2-1} e^{j2\pi \cdot (N_2-1) \cdot \frac{m}{O_2 N_2}} \end{bmatrix}$$

Where $0 < \beta_i, \gamma_k \le 1$ (i=0, 1, ..., $N_1$-1; k=0, 1, ..., $N_2$-1) are amplitude scaling factors. $\beta_i = 1$, $\gamma_k = 1$ (i=0, 1, ..., $N_1$-1; k=0, 1, ..., $N_2$-1) correspond to no tapering. DFT beams (with or without a magnitude taper) have a linear phase shift between elements along each of the two dimensions. Without loss of generality, one can assume that the elements of w(l, m) are ordered according to w(l, m)=$w_{1D}$(l, $N_1$, $O_1$, $\beta$)$\otimes w_{1D}$(m, $N_2$, $O_2$, $\gamma$) such that adjacent elements correspond to adjacent antenna elements along dimension $N_2$, and elements of w(l, m) spaced $N_2$ apart correspond to adjacent antenna elements along dimension $N_1$. Then the phase shift between two elements $w_{s_1}$(l, m) and $w_{s_2}$(l, m) of w(l, m) can be expressed as:

$$w_{s_2}(l, m) = w_{s_1}(l, m) \cdot \left(\frac{\alpha_{s_2}}{\alpha_{s_1}}\right) \cdot e^{j2\pi((k_1-i_1)\Delta_1 + (k_2-i_2)\Delta_2)}$$

Where
$s_1 = i_1 N_2 + i_2$ and $s_2 = k_1 N_2 + k_2$ (with $0 \le i_2 < N_2$, $0 \le k_2 < N_2$, and $0 \le k_1 < N_1$) are integers identifying two entries of the beam w(l, m) so that ($i_1$, $i_2$) indicates to a first entry of beam w(l, m) that is mapped to a first antenna element (or port) and ($k_1$, $k_2$) indicates to a second entry of beam w(l, m) that is mapped to a second antenna element (or port).
$\alpha_{s_1} = \beta_{i_1} \gamma_{i_2}$ and $\alpha_{s_2} = \beta_{k_1} \gamma_{k_2}$ are real numbers. $\alpha_i \ne 1$ (i=$s_1$,$s_2$) if magnitude tapering is used; otherwise $\alpha_i = 1$.

$$\Delta_1 = \frac{l}{O_1 N_1}$$

is a phase shift corresponding to a direction along an axis, e.g. the horizontal axis ('azimuth').

$$\Delta_2 = \frac{m}{O_2 N_2}$$

is a phase shift corresponding to direction along an axis, e.g. the vertical axis ('elevation').

Therefore, a $k^{th}$ beam d(k) formed with precoder w($l_k$, $m_k$) can also be referred to, for simplicity, by the corresponding precoder w($l_k$,$m_k$), i.e. d(k)=w($l_k$, $m_k$), although a 'precoder' is used to form a 'beam'. Thus, when referring to the precoder used to form it, in this disclosure, a beam d(k) can in this disclosure be also described as a set of complex numbers, each element of the set being characterized by at least one complex phase shift such that an element of the beam is related to any other element of the beam where $d_n(k) = d_i(k) \alpha_{i,n} e^{j2\pi(p\Delta_{1,k} + q\Delta_{2,k})} = d_i(k) \alpha_{i,n} (e^{j2\pi\Delta_{1,k}})^p (e^{j2\pi\Delta_{2,k}})^q$, where $d_i(k)$ is the $i^{th}$ element of a beam d(k), $\alpha_{i,n}$ is a real number corresponding to the $i^{th}$ and $n^{th}$ elements of the beam d(k); p and q are integers; and $\Delta_{1,k}$ and $\Delta_{2,k}$ are real numbers corresponding to a beam with index pair ($l_k$, $m_k$) that determine the complex phase shifts $e^{j2\pi\Delta_{1,k}}$ and $e^{j2\pi\Delta_{2,k}}$, respectively. Index pair ($l_k$, $m_k$) corresponds to a direction of arrival or departure of a plane wave when beam d(k) is used for transmission or reception in a UPA or ULA. A beam d(k) can be identified with a single index k' where =$l_k$+$N_1 O_1 m_k$, i.e., along vertical or $N_2$ dimension first, or alternatively k'=$N_2 O_2 l_k$+$m_k$, i.e. along horizontal or $N_1$ dimension first.

Figure 5:
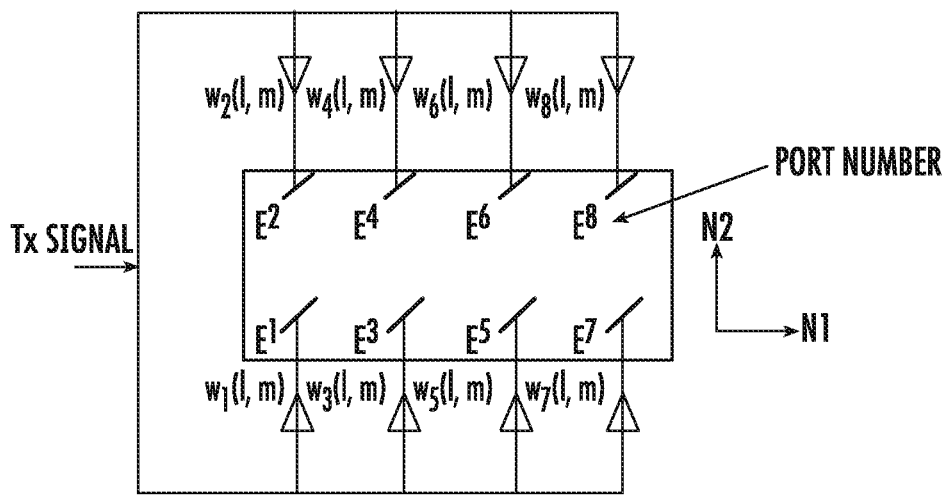
FIG. 5 illustrates mapping of antenna ports.

An example of precoder elements of a beam w(l, m) to antenna ports mapping is shown in FIG. 5 where a single polarization 2D antenna with (N1, N2)=(4,2) is illustrated. $w_i$(l, m) is applied on the transmit (Tx) signal to port i (i=1, 2, ..., 8) to antenna elements E1-E8. There is a constant phase shift between any two precoder elements associated with two adjacent antenna ports along each dimension. For example, with $\Delta_2$ defined as above, the phase shift between $w_1$(l, m) and $w_2$(l, m) is $e^{j2\pi\Delta_2}$, which is the same as the phase shift between $w_7$(l, m) and $w_8$(l, m). Similarly, with $\Delta_1$ defined as above, the phase shift between $w_2$(l, m) and $w_4$(l, m) is $e^{j2\pi\Delta_1}$, which is the same as the phase shift between $w_5$(l, m) and $w_7$(l, m).

Extending the precoder for a dual-polarized ULA may then be done as $$w_{2D,DP}(l, m, \phi) = \begin{bmatrix} 1 \\ e^{j\phi} \end{bmatrix} \otimes w_{2D}(l, m) = \begin{bmatrix} w_{2D}(l, m) \\ e^{j\phi} w_{2D}(l, m) \end{bmatrix} \quad \text{Equation 6}$$

$$= \begin{bmatrix} w_{2D}(l, m) & 0 \\ 0 & w_{2D}(l, m) \end{bmatrix} \begin{bmatrix} 1 \\ e^{j\phi} \end{bmatrix}$$

A precoder matrix $W_{2D,DP}$ for multi-layer transmission may be created by appending columns of DFT precoder vectors as $$W_{2D,DP}^{(R)} = [w_{2D,DP}(l_1,m_1,\phi_1) w_{2D,DP}(l_2,m_2,\phi_2) \ldots w_{2D,DP}(l_R,m_R,\phi_R)]$$

where R is the number of transmission layers, i.e. the transmission rank. In a special case for a rank-2 DFT precoder, $m_1 = m_2 = m$ and $l_1 = l_2 = l$, we have $$w_{2D,DP}^{(2)}(l, m, \phi_1, \phi_2) = [w_{2D,DP}(l, m, \phi_1) \; w_{2D,DP}(l, m, \phi_2)] \quad \text{Equation 7}$$

$$= \begin{bmatrix} w_{2D}(l, m) & 0 \\ 0 & w_{2D}(l, m) \end{bmatrix} \begin{bmatrix} 1 & 1 \\ e^{j\phi_1} & e^{j\phi_2} \end{bmatrix}$$

For each rank, all the precoder candidates form a 'precoder codebook' or a 'codebook'. A wireless device can first determine the rank of the estimated downlink wideband channel based on CSI-RS. After the rank is identified, for each subband the wireless device then searches through all the precoder candidates in a codebook for the determined rank to find the best precoder for the subband. For example, in case of rank=1, the wireless device would search through $w_{2D,DP}$(k,l,$\phi$) for all the possible (k,l,$\phi$) values. In case of rank=2, the wireless device would search through $W_{2D,DP}^{(2)}$(k,l,$\phi_1$,$\phi_2$) for all the possible (k,l,$\phi_1$,$\phi_2$) values.

With multi-user MIMO, two or more users in the same cell are co-scheduled on the same time-frequency resource. That is, two or more independent data streams are transmitted to different wireless devices at the same time, and the spatial domain is used to separate the respective streams. By transmitting several streams simultaneously, the capacity of the system can be increased. This however, comes at the cost of reducing the SINR per stream, as the power has to be shared between streams and the streams will interfere with each other.

When increasing the antenna array size, the increased beamforming gain will lead to higher SINR, however, as the user throughput depends only logarithmically on the SINR (for large SINRs), it is instead beneficial to trade the gains in SINR for a multiplexing gain, which increases linearly with the number of multiplexed users.

Accurate CSI is required in order to perform appropriate null forming between co-scheduled users. In the current LTE Rel.13 standard, no special CSI mode for MU-MIMO exists and thus, MU-MIMO scheduling and precoder construction has to be based on the existing CSI reporting designed for single-user MIMO (that is, a PMI indicating a DFT-based precoder, a RI and a CQI). This may prove quite challenging for MU-MIMO, as the reported precoder only contains information about the strongest channel direction for a user and may thus not contain enough information to do proper null forming, which may lead to a large amount of interference between co-scheduled users, reducing the benefit of MU-MIMO.

Advanced codebooks comprising precoders with multiple beams have been shown to improve MU-MIMO performance due to enhanced null forming capabilities. Such multi-beam precoders may be defined as follows. We first define $D_N$ as a size N×N DFT matrix, i.e. the elements of $D_N$ are defined as $$[D_N]_{k,l} = \frac{1}{\sqrt{N}} e^{j\frac{2\pi kl}{N}}.$$

Further we define $$R_N(q) = \text{diag}\left(\left[ e^{j2\pi \cdot 0 \cdot \frac{q}{N}} \quad e^{j2\pi \cdot 1 \cdot \frac{q}{N}} \quad \ldots \quad e^{j2\pi \cdot (N-1) \cdot \frac{q}{N}} \right]\right)$$

to be a size N×N rotation matrix, defined for $0 \le q < 1$. Multiplying $D_N$ with $R_N(q)$ from the left creates a rotated DFT matrix with entries $$[R_N(q)D_N]_{k,l} = \frac{1}{\sqrt{N}} e^{j\frac{2\pi k(l+q)}{N}}.$$

The rotated DFT matrix $R_N(q)D_N = [d_1 \ d_2 \ \ldots \ d_N]$ consists of normalized orthogonal column vectors $\{d_i\}_{i=1}^N$ which furthermore span the vector space $\mathbb{C}^N$. That is, the columns of $R_N(q)D_N$, for any q, is an orthonormal basis of $\mathbb{C}^N$.

We begin with extending the (rotated) DFT matrices that were appropriate transforms for a single-polarized ULA as discussed above to also fit the more general case of dual-polarized 2D uniform planar arrays (UPAs).

We define a rotated 2D DFT matrix as $D_{N_V,N_H}(q_V,q_H) = (R_{N_H}(q_H)D_{N_H}) \otimes (R_{N_V}(q_V)D_{N_V}) = [d_1 \ d_2 \ \ldots \ d_{N_V N_H}]$. The columns $\{d_i\}_{i=1}^{N_{DP}}$ of $D_{N_V,N_H}(q_V,q_H)$ constitutes an orthonormal basis of the vector space $\mathbb{C}^{N_V N_H}$. Such a column $d_i$ is henceforth denoted a (DFT) beam, and we note that it fulfills the earlier definition of a beam given above.

Consider now a dual-polarized UPA, where the channel matrix $H = [H_{pol1} \ H_{pol2}]$. Create a dual-polarized beam space transformation matrix $$B_{N_V,N_H}(q_V, q_H) =$$

$$I_2 \otimes D_{N_V,N_H}(q_V, q_H) = \begin{bmatrix} D_{N_V,N_H}(q_V, q_H) & 0 \\ 0 & D_{N_V,N_H}(q_V, q_H) \end{bmatrix} =$$

$$\begin{bmatrix} d_1 & d_2 & \ldots & d_{N_V N_H} & 0 & 0 & \ldots & 0 \\ 0 & 0 & \ldots & 0 & d_1 & d_2 & \ldots & d_{N_V N_H} \end{bmatrix} = [b_1 \ b_2 \ \ldots \ b_{2N_V N_H}].$$

The columns $\{b_i\}_{i=1}^{2N_V N_H}$ of $B_{N_V,N_H}(q_V, q_H)$ constitutes an orthonormal basis of the vector space $\mathbb{C}^{2N_V N_H}$. Such a column $b_i$ is henceforth denoted a single-polarized beam (SP-beam) as it is constructed by a beam d transmitted on a single polarization $$\left(\text{i.e. } b = \begin{bmatrix} d \\ 0 \end{bmatrix} \text{ or } b = \begin{bmatrix} 0 \\ d \end{bmatrix}\right).$$

We also introduce a notation dual-polarized beam to refer to a beam transmitted on both polarizations (co-phased with an (arbitrary) co-phasing factor $e^{j\alpha}$, i.e.

$$b_{DP} = \begin{bmatrix} d \\ e^{j\alpha} d \end{bmatrix}).$$

Utilizing the assumption that the channel is somewhat sparse, we can capture sufficiently much of the channel energy by only selecting a column subset of $B_{N_V,N_H}(q_V, q_H)$. That is, it is sufficient to describe a couple of the SP-beams, which keeps down the feedback overhead. So, we can select a column subset $I_S$ consisting of $N_{SP}$ columns of $B_{N_V,N_H}(q_V, q_H)$, to create a reduced beam space transformation matrix $B_{I_S} = [b_{I_S(1)} \ b_{I_S(2)} \ \ldots \ b_{I_S(N_{SP})}]$. E.g., one can select columns number $I_S = [1 \ 5 \ 10 \ 25]$ to create the reduced beam space transformation matrix $B_{I_S} = [b_1 \ b_5 \ b_{10} \ b_{25}]$.

The most general precoder structure for precoding of a single layer is given as:

$$w = B_{I_S} \begin{bmatrix} c_1 \\ c_2 \\ \vdots \\ c_{N_{SP}} \end{bmatrix} = [b_{I_S(1)} \ b_{I_S(2)} \ \ldots \ b_{I_S(N_{SP})}] \begin{bmatrix} c_1 \\ c_2 \\ \vdots \\ c_{N_{SP}} \end{bmatrix} = \sum_{i=1}^{N_{SP}} c_i b_{I_S(i)},$$

where $\{c_i\}_{i=1}^{N_{SP}}$ are complex coefficients. A more refined multi-beam precoder structure is achieved by separating the complex coefficients in a power (or amplitude) and a phase part as $$w = B_{I_S} \begin{bmatrix} c_1 \\ c_2 \\ \vdots \\ c_{N_{SP}} \end{bmatrix} = B_{I_S} \begin{bmatrix} \sqrt{p_1} e^{j\alpha_1} \\ \sqrt{p_2} e^{j\alpha_2} \\ \vdots \\ \sqrt{p_{N_{SP}}} e^{j\alpha_{N_{SP}}} \end{bmatrix} =$$

-continued $$B_{I_S} \begin{bmatrix} \sqrt{p_1} & 0 & & \\ 0 & \sqrt{p_2} & \ddots & \\ & \ddots & \ddots & 0 \\ & & \ddots & 0 & \sqrt{p_{N_{SP}}} \end{bmatrix} \begin{bmatrix} e^{j\alpha_1} \\ e^{j\alpha_2} \\ \vdots \\ e^{j\alpha_{N_{SP}}} \end{bmatrix} = B_{I_S} \sqrt{P} \begin{bmatrix} e^{j\alpha_1} \\ e^{j\alpha_2} \\ \vdots \\ e^{j\alpha_{N_{SP}}} \end{bmatrix}$$

The precoder vector may then be expressed as $$w = \underbrace{B_{I_S} \sqrt{P}}_{=W_1} \underbrace{\begin{bmatrix} e^{j\alpha_1} \\ e^{j\alpha_2} \\ \vdots \\ e^{j\alpha_{N_{SP}}} \end{bmatrix}}_{=W_2} = W_1 W_2.$$

The selection of $W_1$ may then be made on a wideband basis while the selection of $W_2$ may be made on a subband basis. The precoder vector for subband 1 may be expressed as $w_l = W_1 W_2(l)$. That is, only $W_2$ is a function of the subband index 1.

As multiplying the precoder vector w with a complex constant C does not change its beamforming properties (as only the phase and amplitude relative to the other single-polarized beams is of importance), one may without loss of generality assume that the coefficients corresponding to e.g. SP-beam 1 is fixed to $p_1 = 1$ and $e^{j\alpha_1} = 1$, so that parameters for one less beam needs to be signaled from the wireless device to the base station. Furthermore, the precoder may be further assumed to be multiplied with a normalization factor, so that, e.g., a sum power constraint is fulfilled, i.e., that is $\|w\|^2 = 1$. Any such normalization factor is omitted from the equations herein for clarity.

What needs to be fed back by the wireless device to the base station is thus

The chosen columns of $B_{N_V, N_H}(q_V, q_H)$, i.e. the $N_{SP}$ single-polarized beams. This requires at most $N_{SP} \cdot \log_2 2N_V N_H$ bits;

The vertical and horizontal DFT basis rotation factors $q_V$ and $q_H$. For instance, the $$q(i) = \frac{i}{Q},$$

$i = 0, 1, \ldots, Q-1$, for some value of Q. The corresponding overhead would then be $2 \cdot \log_2 Q$ bits;

The (relative) power levels $\{p_2, p_3, \ldots p_{N_{SP}}\}$ of the SP-beams. If L is the number of possible discrete power levels, $(N_{SP}-1) \cdot \log_2 L$ bits are needed to feed back the SP-beam power levels; and The co-phasing factors $$\{e^{j\alpha_2}, e^{j\alpha_3}, \ldots, e^{j\alpha_{N_{SP}}}\}$$

of the SP-beams. For instance, $$\alpha(k) = \frac{2\pi k}{K},$$

$k = 0, 1, \ldots K-1$, for some value of K. The corresponding overhead would be, $(N_{SP}-1) \cdot \log_2 K$ bits per rank per W2 report.

In some implementations, the phases of the SP-beams may be quantized across frequency. We assume that a multi-beam precoder vector $w_f$ for each PRB $f = 0, 1, \ldots, N_{RB}-1$ should be quantized and fed back and that the multi-beam precoder vector is a function of the SP-beam phases as $$w_f = B_{I_S} \sqrt{P} \begin{bmatrix} e^{j\alpha_1(f)} \\ e^{j\alpha_2(f)} \\ \vdots \\ e^{j\alpha_{N_{SP}}(f)} \end{bmatrix}.$$

Note here again that one may set $e^{j\alpha_1(f)} = 1$ as only the relative phases are important. We are interested in characterizing the phase change over frequency for each SP-beam, that is, the vectors $\phi_i = [e^{j\alpha_i(0)} \, e^{j\alpha_i(1)} \, \ldots \, e^{j\alpha_i(N_{RB}-1)}]^T$, $i = 2, 3, \ldots, N_{SP}$.

In some such implementations, the phases $\phi_i$ of each SP-beam are approximated as a polynomial function over frequency. That is, $$\phi_i(f) = e^{j \sum_{m=0}^{M} a_m f^m},$$

Where $\{a_m\}_{m=0}^{M}$ are a set of real-valued coefficients. Instead of quantizing and feeding back a selection of the actual phases for each SP-beam and frequency, the parametrized real-valued coefficients are quantized and fed back as part of the precoder feedback. This may significantly reduce the feedback overhead required to convey the selection of SP-beam phases, especially if the channel bandwidth is large and the order of the polynomial is small.

The coefficients $a_m$ may then be selected from a set of possible polynomial phase coefficients. For example, the order M of the polynomial may be equal to 1, so that the phase change over frequency is approximated as a linear function. In this case, only two coefficients per beam, $a_0$ and $a_1$, need to be estimated, quantized and fed back.

Some embodiments include optimization of the feedback overhead associated with a multi-beam precoder codebook by using different quantization granularity and/or frequency granularity of different beam components.

Given that there is a certain "budget" of feedback bits to spend on quantizing the frequency-selective phases for each beam, one may spend more bits on quantizing the stronger beam components. Beams with weaker power level will to a lesser extent contribute to the overall precoding performance. Therefore, if one wishes to minimize the overall absolute quantization error, one may allow that the weaker beams have a larger relative quantization error than the stronger beams and thus assign less bits for phase quantization to the weaker beams than the stronger beams.

The frequency-selectivity of the phases of each beam component in a multi-beam precoder may be different. Thus, performance may be increased if the frequency-granularity of the reporting of each constituent beam component may be set independently.

Since the channel delay spread within each beam is relatively small, the phase change over frequency (or subbands) is generally also relatively small (e.g., within 180 degrees). Therefore, the phase differences between adjacent subbands may be encoded with less number of bits than encoding the absolute phase of each subband.

By allowing the quantization and/or frequency granularity of the phases of each constituent beam component in the multi-beam precoder codebook to be set individually, the precoding performance can be improved while maintaining the same or decreasing the feedback overhead.

Figure 6:
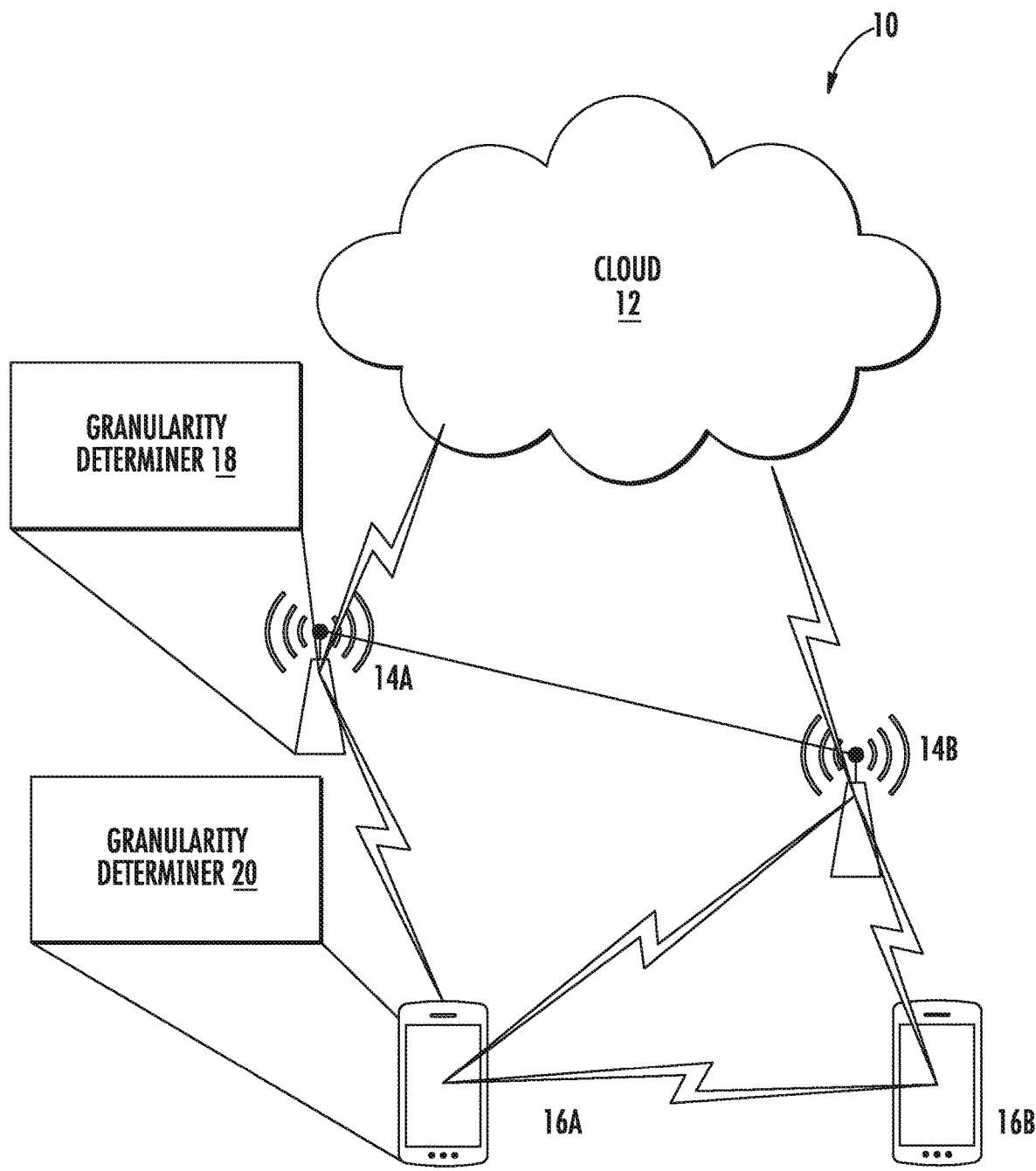
FIG. 6 is a block diagram of a wireless communication system constructed in accordance with principles set forth herein.

Returning to the drawing figures, FIG. 6 is a block diagram of a wireless communication network configured according to principles set forth herein. The wireless communication network 10 includes a cloud 12 which may include the Internet and/or the public switched telephone network (PSTN). Cloud 12 may also serve as a backhaul network of the wireless communication network 10. The wireless communication network 10 includes one or more network nodes 14A and 14B, which may communicate directly, for example via an X2 interface in LTE embodiments, and are referred to collectively as network nodes 14. The network nodes 14 may serve wireless devices 16A and 16B, referred to collectively herein as wireless devices 16. Note that, although only two wireless devices 16 and two network nodes 14 are shown for convenience, the wireless communication network 10 may typically include many more wireless devices (WDs) 16 and network nodes 14. Further, in some embodiments, WDs 16 may communicate directly using what is sometimes referred to as a side link connection.

The network node 14 has a granularity determiner or controller 18 configured to configure the wireless device to transmit a precoder comprising a first and second beam phase parameter, where the frequency granularity of the beam phase parameters is different. A number of phase values used for the second beam phase parameter may be less than a number of phase values used for the first beam phase parameter. Alternatively, or additionally, a frequency-granularity used for the second beam phase parameter may be greater than a frequency-granularity used for the first beam phase parameter. Similarly, the wireless device 16 has a CSI reporter with configurable granularity 20 configured to transmit a precoder comprising a first and a second beam phase parameter, wherein the granularity of the beam phase parameters is different. A number of phase values used for the second beam phase parameter may be less than a number of phase values used for the first beam phase parameter. Alternatively, or additionally, a frequency-granularity used for the second beam phase parameter may be greater than a frequency-granularity used for the first beam phase parameter.

Figure 7:
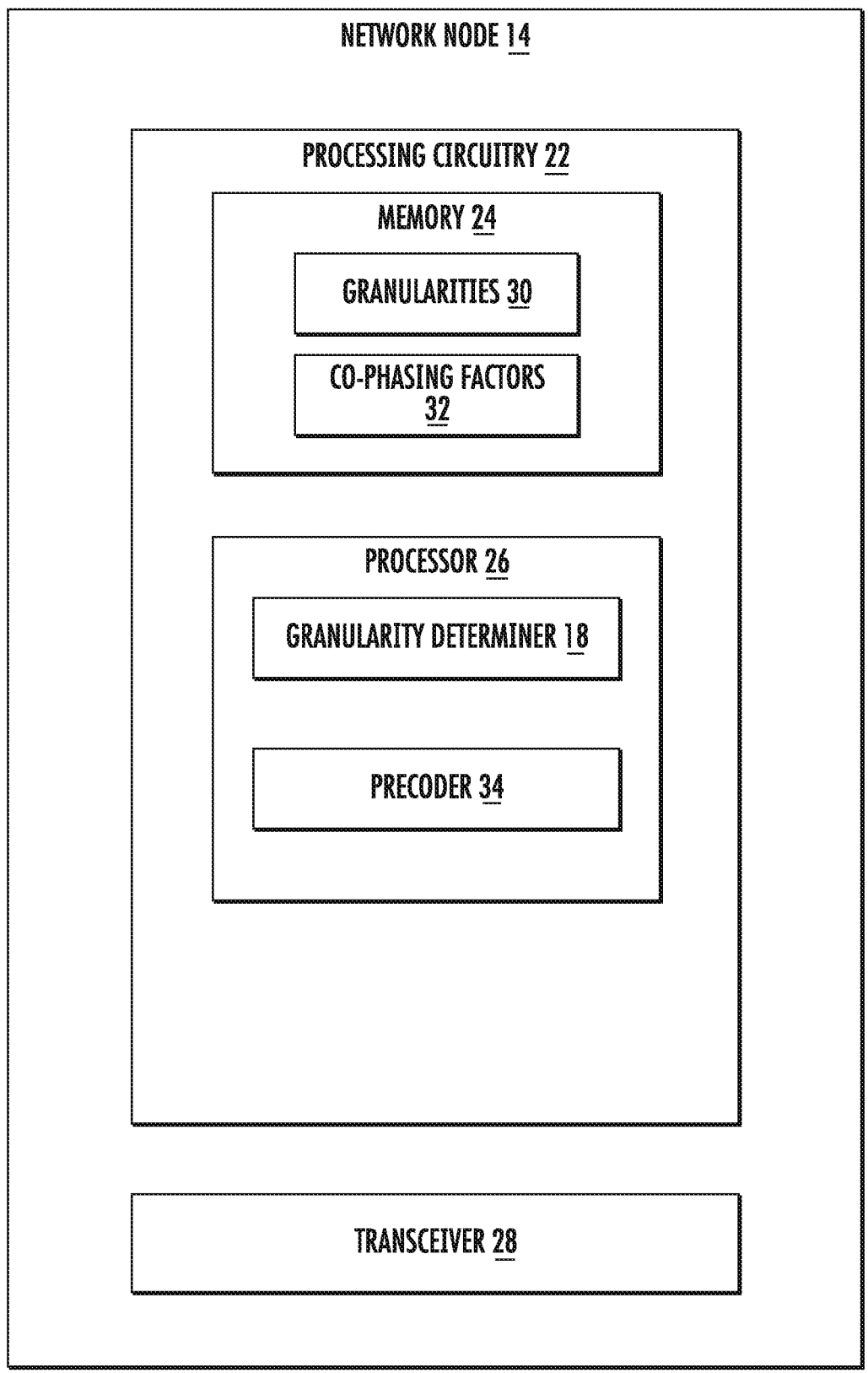
FIG. 7 is a block diagram of a network node.

FIG. 7 is a block diagram of a network node 14 configured to determine a precoder using a multi-beam precoder codebook. The network node 14 has processing circuitry 22. In some embodiments, the processing circuitry may include a memory 24 and processor 26, the memory 24 containing instructions which, when executed by the processor 26, configure processor 26 to perform the one or more functions described herein, including those relating to determining a configuration of a wireless device 16. In addition to a traditional processor and memory, processing circuitry 22 may include integrated circuitry for processing and/or control, e.g., one or more processors and/or processor cores and/or FPGAs (Field Programmable Gate Array) and/or ASICs (Application Specific Integrated Circuitry).

Processing circuitry 22 may comprise and/or be connected to and/or be configured for accessing (e.g., writing to and/or reading from) memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may include a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store a granularity 30 of a co-phasing factor for each of a plurality of beams. The memory 24 is further configured to store co-phasing factors 32 for each of a plurality of beams. In some embodiments, the processor 26 is configured to determine a granularity of a co-phasing factor for each of a plurality of beams via a granularity determiner 18. The processor 26 is configured to determine a precoder using a first and second co-phasing factors. A transceiver 28 is configured to receive the first co-phasing factor determined for a first beam with a first granularity, and receive the second co-phasing factor determined for a second beam with a second granularity, the second granularity being greater than the first granularity. In some embodiments, the transceiver 28 is further configured to transmit the granularities to a wireless device 16. Of note, although the term "transceiver" is used herein, it is understood that this term is used for convenience and should not be construed as limiting implementations to a single communication element, e.g., an integrated circuit, that includes both a transmitter and a receiver. It is understood that a physically separate transmitter and receiver can be used.

Figure 8:
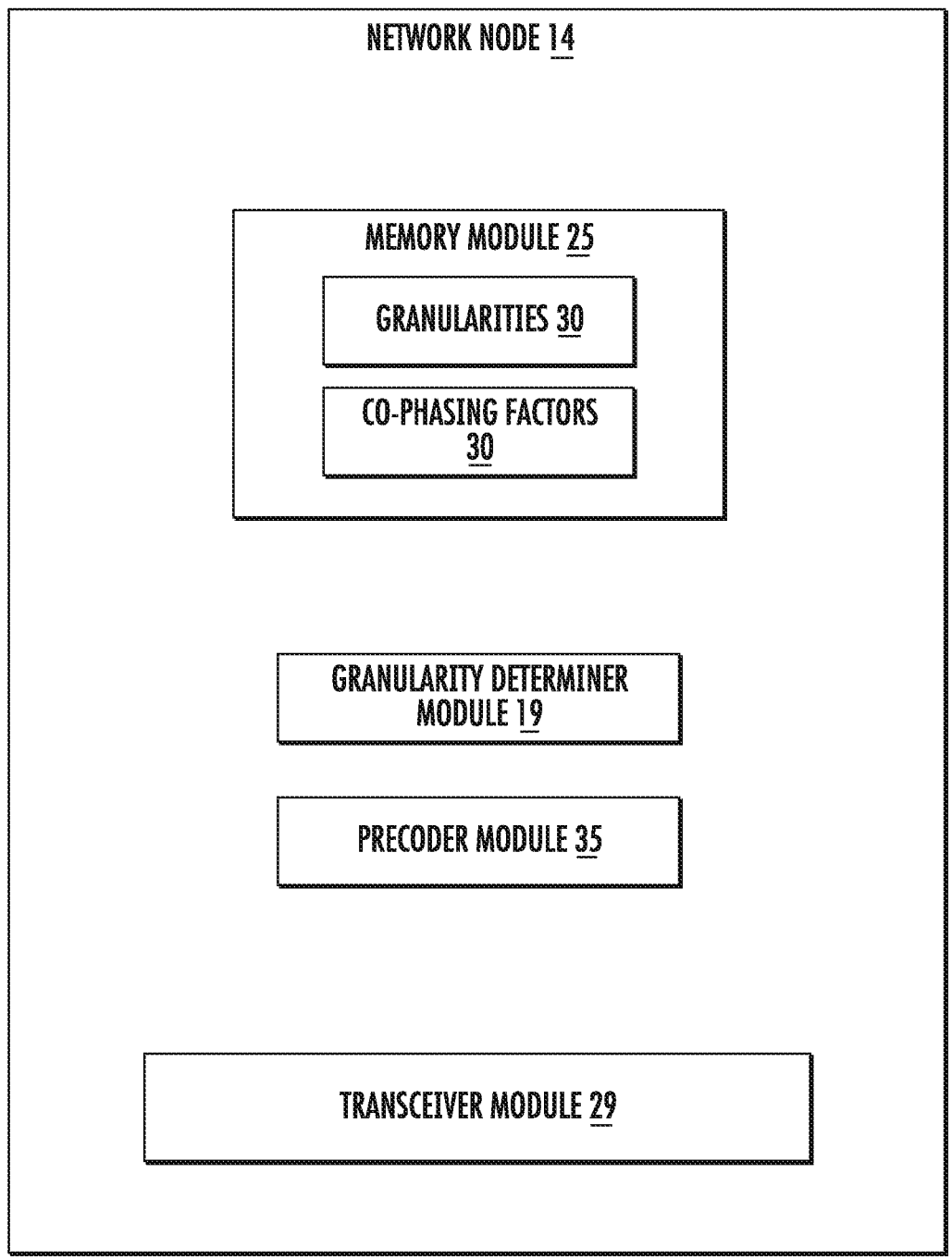
FIG. 8 is a block diagram of an alternative embodiment of a network node.

FIG. 8 is a block diagram of an alternative embodiment of the network node 14, including a memory module 25 configured to store a granularity 30 of a co-phasing factor for each of a plurality of beams and to store co-phasing factors 32. A granularity determiner module 19 is configured to determine a granularity of a co-phasing factor for each of a plurality of beams. A precoder module 35 is configured to determine a precoder using the co-phasing factors. The network node 14 also includes a transceiver module 29 configured to receive co-phasing factors and, in some embodiments, to transmit the granularities to a wireless device 16.

Figure 9:
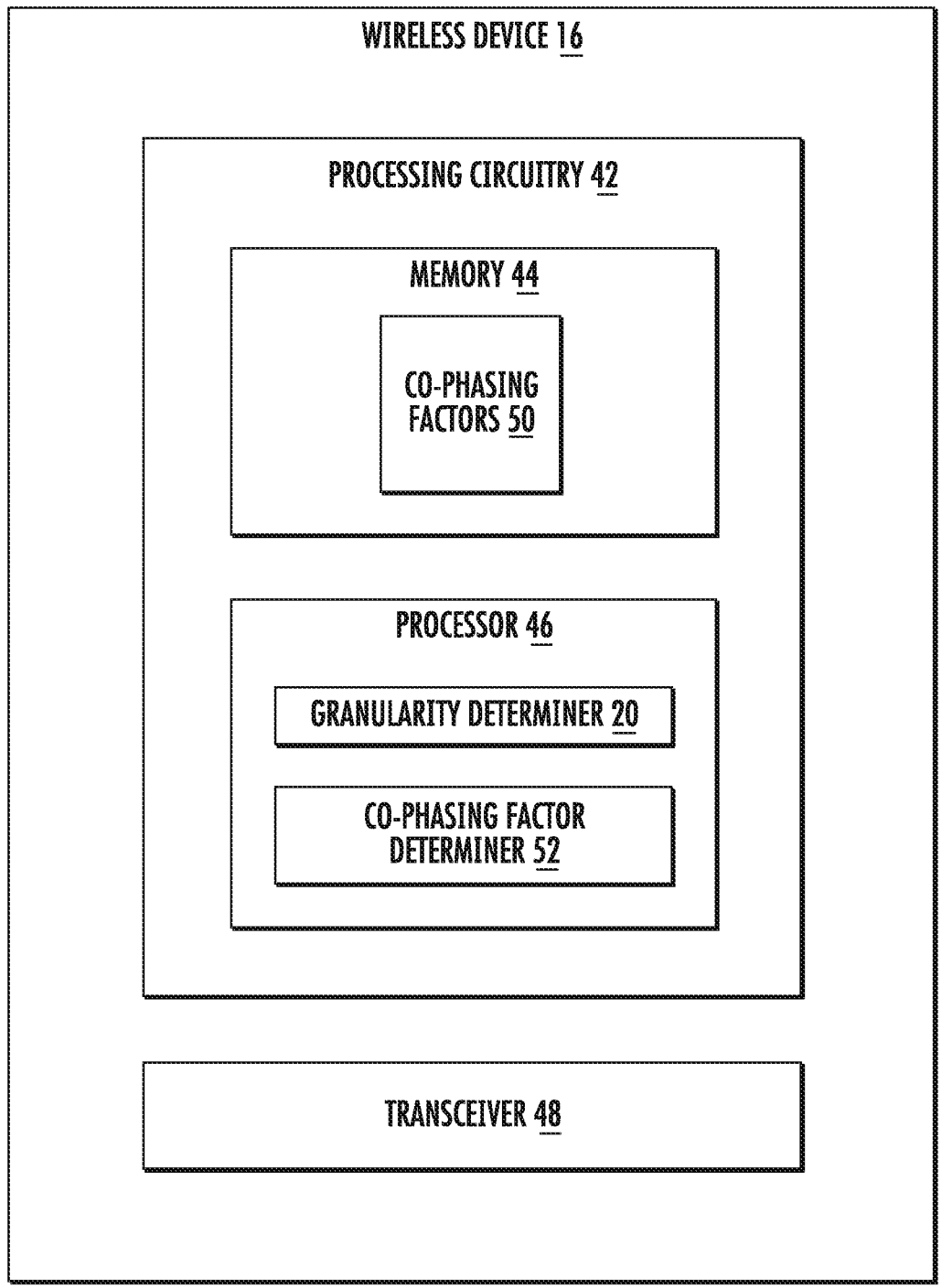
FIG. 9 is a block diagram of a wireless device.

FIG. 9 is a block diagram of a wireless device 16 configured to determine a precoder from a multi-beam precoder codebook. The wireless device 16 includes processing circuitry 42 including a memory 44 and a processor 46. In some embodiments, the processing circuitry may include a memory 44 and processor 46, the memory 44 containing instructions which, when executed by the processor 46, configure processor 46 to perform the one or more functions described herein, including those relating to determining a configuration of a wireless device 16. In addition to a traditional processor and memory, processing circuitry 42 may include integrated circuitry for processing and/or control, e.g., one or more processors and/or processor cores and/or FPGAs (Field Programmable Gate Array) and/or ASICs (Application Specific Integrated Circuitry).

Processing circuitry 42 may comprise and/or be connected to and/or be configured for accessing (e.g., writing to and/or reading from) memory 44, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may include a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 is configured to store co-phasing factors. The processor 46 is configured to determine, for each beam, via a granularity determiner 20 a granularity of a co-phasing factor and to determine via a co-phase factor determiner 52, a co-phasing factor for each beam with the determined granularity. The wireless device 16 also includes a transceiver 48 configured to transmit the granularities and co-phasing factors to a network node 14.

Figure 10:
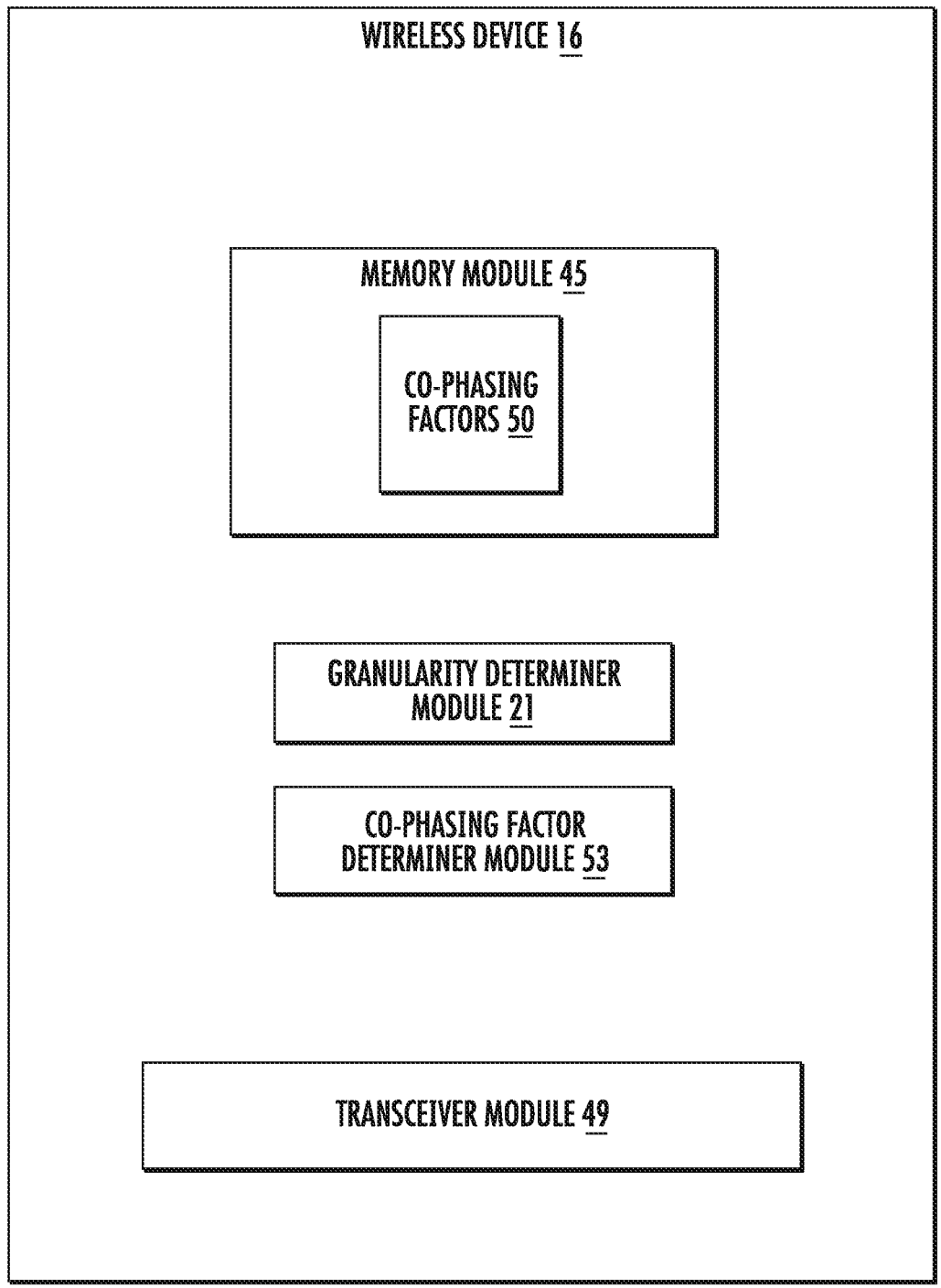
FIG. 10 is a block diagram of an alternative embodiment of a wireless device.

FIG. 10 is a block diagram of an alternative embodiment of the wireless device 16. A memory module 45 is configured to store co-phasing factors 50. A granularity determiner module 21 is configured to determine, for each beam, a granularity of a co-phasing factor. A co-phase factor determiner module 53 is configured to determine a co-phasing factor for each beam with the determined granularity. A transceiver module 49 is configured to transmit the granularities and co-phasing factors to a network node 14.

Figure 11:
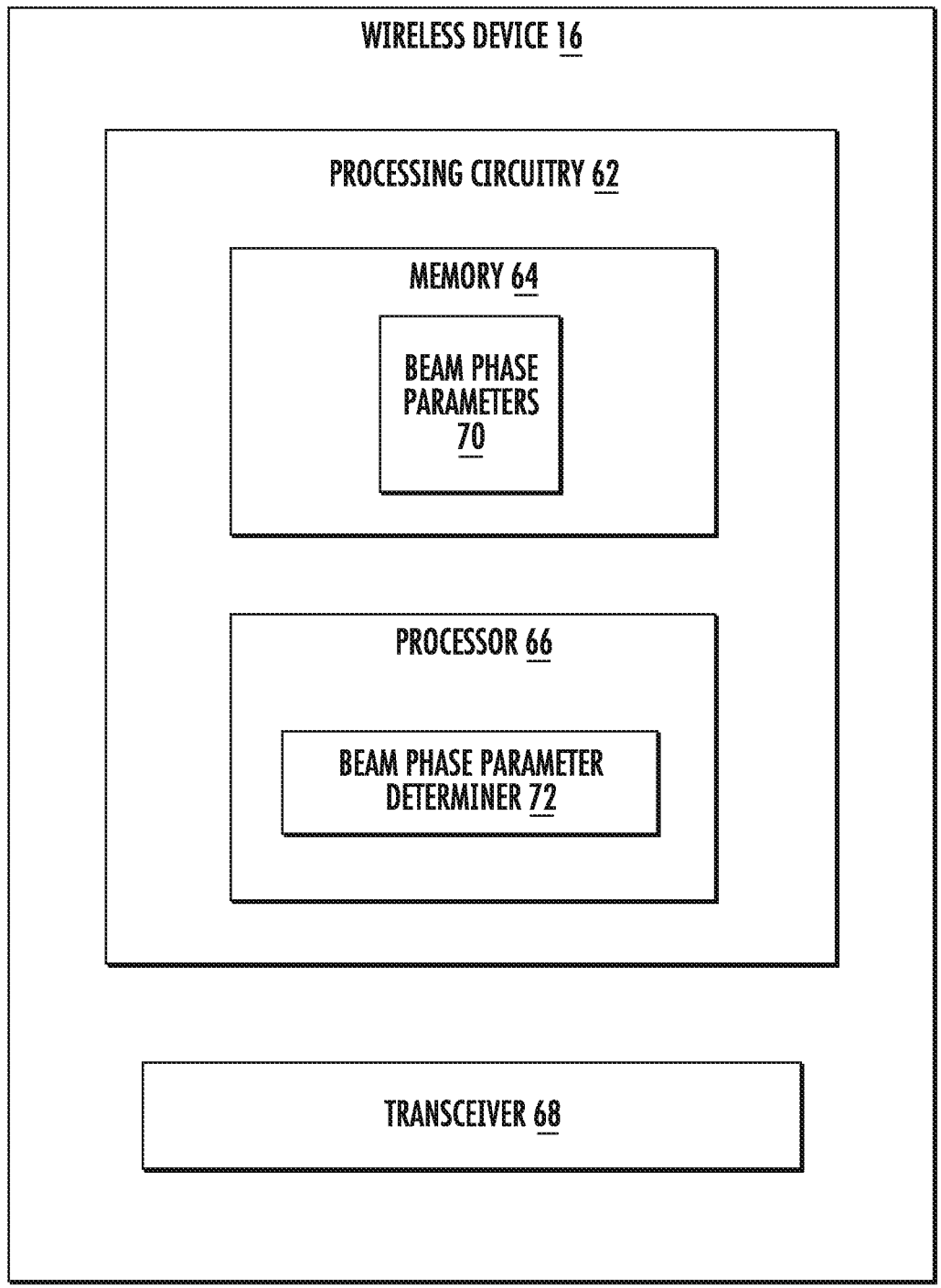
FIG. 11 is a block diagram of another alternative embodiment of a wireless device.

FIG. 11 is a block diagram of an alternative embodiment of the wireless device 16 configured to determine a precoder from a multi-beam precoder codebook. The wireless device 16 includes processing circuitry 62 including a memory 64 and a processor 66. In some embodiments, the processing circuitry may include a memory 64 and processor 66, the memory 64 containing instructions which, when executed by the processor 66, configure processor 66 to perform the one or more functions described herein, including those relating to determining a configuration of a wireless device 16. In addition to a traditional processor and memory, processing circuitry 62 may include integrated circuitry for processing and/or control, e.g., one or more processors and/or processor cores and/or FPGAs (Field Programmable Gate Array) and/or ASIC s (Application Specific Integrated Circuitry).

Processing circuitry 62 may comprise and/or be connected to and/or be configured for accessing (e.g., writing to and/or reading from) memory 64, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 64 may be configured to store code executable by control circuitry and/or other data, e.g., data pertaining to communication, e.g., configuration and/or address data of nodes, etc. Processing circuitry 62 may be configured to control any of the methods described herein and/or to cause such methods to be performed, e.g., by processor 66. Corresponding instructions may be stored in the memory 64, which may be readable and/or readably connected to the processing circuitry 62. In other words, processing circuitry 62 may include a controller, which may include a microprocessor and/or microcontroller and/or FPGA (Field-Programmable Gate Array) device and/or ASIC (Application Specific Integrated Circuit) device. It may be considered that processing circuitry 62 includes or may be connected or connectable to memory, which may be configured to be accessible for reading and/or writing by the controller and/or processing circuitry 62.

The memory 64 is configured to store beam phase parameters 70. The processor 66 is configured to implement a beam phase parameter determiner 72 configured to determine from a codebook an indication of a precoder comprising a first beam phase parameter and a second beam phase parameter corresponding to a first beam and second beam. In some embodiments, the first beam phase parameter takes on one of a first integer number of phase values. The second beam phase parameter takes on one of a second integer number of phase values, the second beam having a lesser power than the first beam and the second integer number of phase values being less than the first integer number of phase values. The transceiver 68 is configured to transmit the selected precoder to a network node 14.

Figure 12:
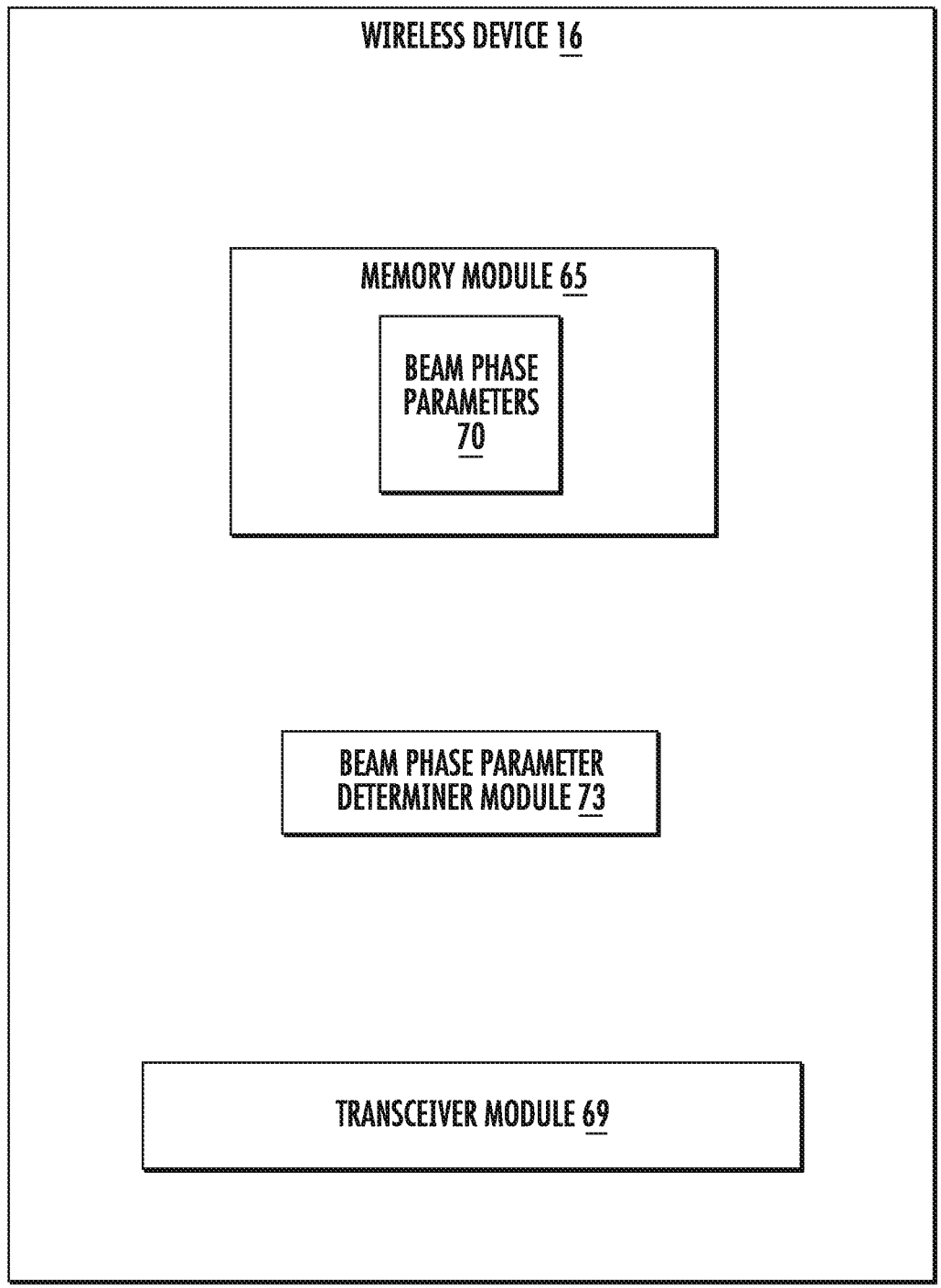
FIG. 12 is a block diagram of yet another alternative embodiment of a wireless device.

FIG. 12 is a block diagram of an alternative embodiment of the wireless device 16. A memory module 65 is configured to store beam phase parameters 70. A beam phase parameter determiner module 73 may be implemented as software executed by a processor to determine from a codebook an indication of a precoder comprising a first beam phase parameter and a second beam phase parameter corresponding to a first beam and second beam. The transceiver module 69 may be implemented in part by software executed by a processor and is configured to transmit the selected precoder to a network node 14.

Figure 13:
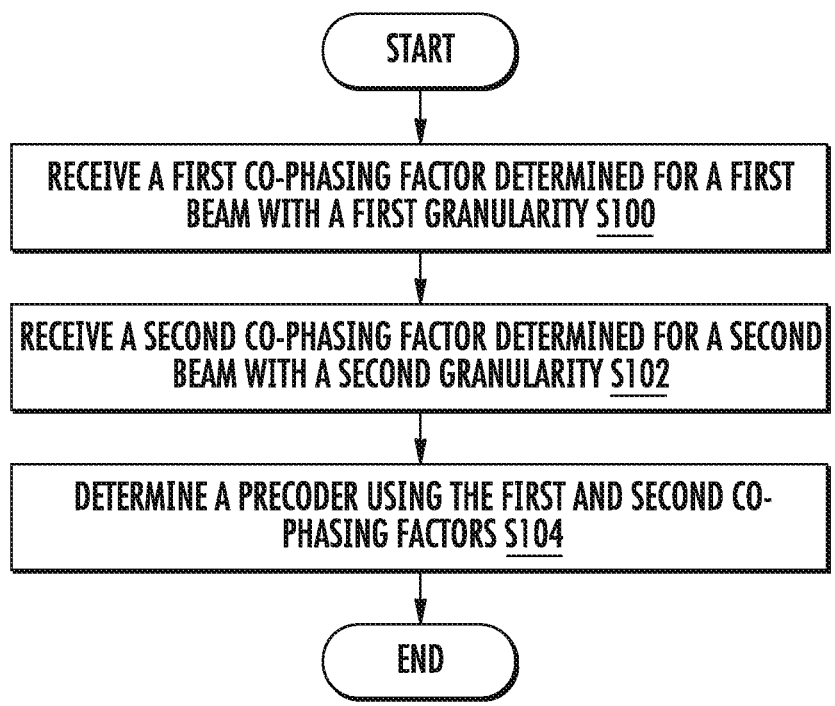
FIG. 13 is a flowchart of an exemplary process for configuring a wireless device.

FIG. 13 is a flowchart of an exemplary process in a network node 14 for determining a precoder using a multi-beam precoder codebook. The process includes receiving, via the transceiver 28, a first co-phasing factor determined for a first beam with a first granularity (block S100). The process further includes receiving, via the transceiver 28, a second co-phasing factor determined for a second beam with a second granularity, the second granularity being greater than the first granularity (block S102). The process further includes determining, via the processor 26, a precoder using the first and second co-phasing factors (block S104).

Figure 14:
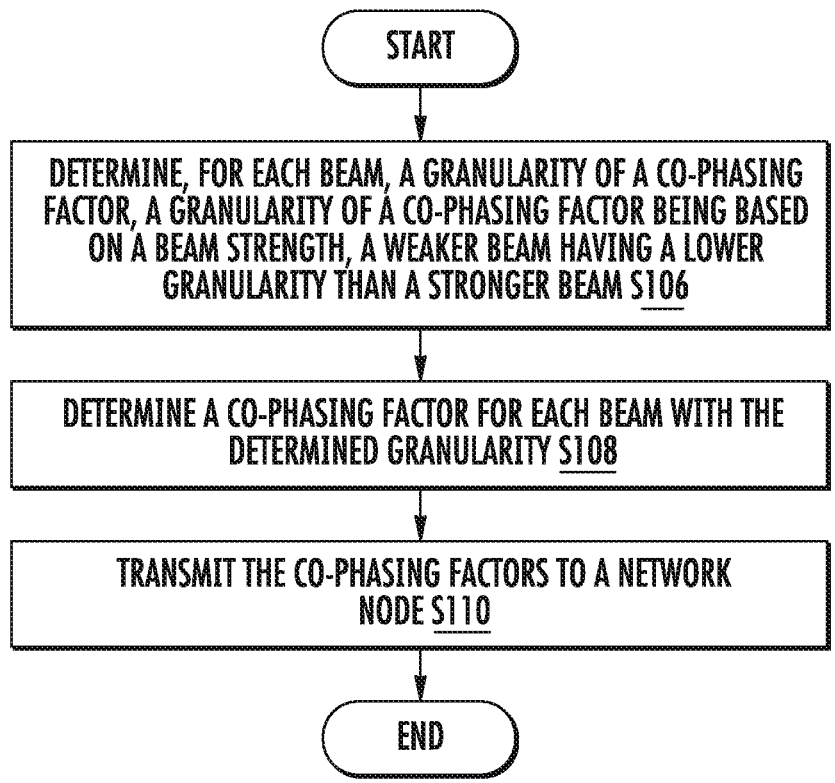
FIG. 14 is a flowchart of an exemplary process for determining a precoder.

FIG. 14 is a flowchart of an exemplary process of determining a precoder from a multi-beam precoder codebook. The process includes determining via a granularity determiner 18, for each beam, a granularity of a co-phasing factor, a granularity of a co-phasing factor for a beam being based on a beam strength, a weaker beam having a lower granularity than a stronger beam (block S106) and determining, via the co-phasing factor determiner 52, a co-phasing factor for each beam with the determined granularity (block S108). The co-phasing factors are transmitted to a network node 14 (block S110).

Figure 15:
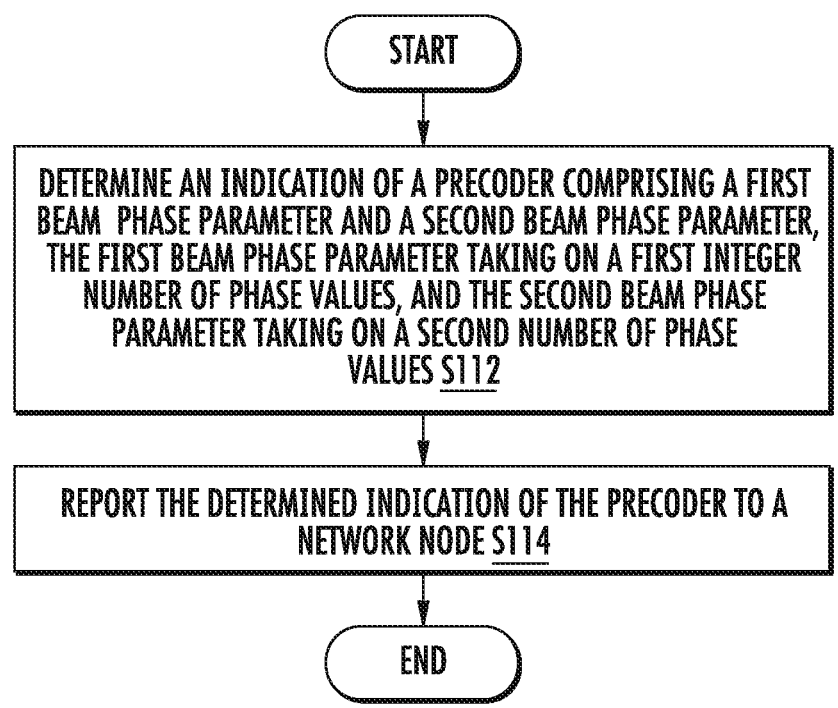
FIG. 15 is a flowchart of an alternative exemplary process for determining a precoder.

FIG. 15 is a flowchart of an exemplary process for a wireless device to determine a precoder from a multi-beam precoder codebook. The process includes determining, via a beam phase parameter 72 from a codebook an indication of a precoder comprising a first beam phase parameter and a second beam phase parameter corresponding to a first beam and second beam, respectively (block S112). The first beam phase parameter takes on one of a first integer number of phase values and corresponds to a first frequency-granularity. The second beam phase parameter takes on one of a second integer number of phase values and corresponds to a second frequency-granularity (block S112). The process also includes reporting, via the transceiver 68, the determined indication of the precoder to the network node 14 (block S114).

Consider a multi-beam precoder codebook as described above, where the precoders W may be constructed by linearly combining a set of beam components and where at least the phases of each beam may be selected. The rank-1 precoders in such a codebook may be expressed as, for instance, $$W = [b_{l_S(1)} \quad b_{l_S(2)} \quad \ldots \quad b_{l_S(N_{SP})}] \begin{bmatrix} 1 & 0 & & \\ 0 & \sqrt{p_2} & & \ddots \\ & & \ddots & 0 \\ & & \ddots & 0 & \sqrt{p_{N_{SP}}} \end{bmatrix} \begin{bmatrix} 1 \\ e^{j\alpha_2} \\ \vdots \\ e^{j\alpha_{N_{SP}}} \end{bmatrix} = B_{l_S}\sqrt{P}\,W_2.$$

In some embodiments, the precoder structure may not include beam power allocation so that $=B_{l_S}W_2$. In other embodiments, the beam power level may be included in $W_2$. It is noted that there are many equivalent ways of expressing a precoder codebook structure comprising constructing the precoders by linearly combining a set of beam components and where at least the phases of each beam may be selected, the specific codebook structure used herein should be regarded as an example of such a codebook structure but some principles of the disclosure are applicable to other codebook structures as well. On a similar note, only rank-1 precoders are used in the examples and explanations herein, but some principles of the disclosure are applicable to codebooks with precoders of any rank.

Some embodiments employ a (possibly) different quantization granularity for each SP-beam component of the precoder W.

In a first set of embodiments, different frequency-granularities of the phases of each beam component is used. This may be described by letting $$W_2(f) = \begin{bmatrix} 1 \\ \phi_2\left(\left\lfloor \frac{f}{G_2} \right\rfloor\right) \\ \vdots \\ \phi_{N_{SP}}\left(\left\lfloor \frac{f}{G_{N_{SP}}} \right\rfloor\right) \end{bmatrix},$$

where $G_i$ denotes the frequency-granularity of beam i and $\phi_i(k)$ denotes a phase corresponding to beam i. Thus, the same value of $\phi_i(k)$ is used for $G_i$ consecutive PRBs in frequency which implies that fewer parameters needs to be fed back as part of the $W_2$ report. An example of different frequency-granularities is illustrated in FIG. 15. Thus, for a bandwidth of $N_{RB}$ PRBs and a frequency-granularity of $G_i$ PRBs, the values $\phi_i(1), \ldots,$ $$\phi_i\left(\left\lfloor \frac{N_{RB}}{G_i} \right\rfloor\right)$$

needs to be fed back for each beam. The resulting $W_2$ report would require $$\left\lfloor \frac{N_{RB}}{G_i} \right\rfloor \cdot \log_2$$

K bits per beam and rank and thus $$\sum_{i=2}^{N_{SP}} \left\lfloor \frac{N_{RB}}{G_i} \right\rfloor \cdot \log_2$$

K bits per rank in total.

In some embodiments, the frequency-granularity of each beam is selected to be a multiple of the subband size. For instance, given a system bandwidth of $N_{RB}=50$ in Table 1, the subband size is defined as $k_{sub}=6$ PRBs. Hence, the frequency-granularity $G_i$ associated with beam i is chosen as an integer multiple of 6 PRBs. Written more generally, the frequency-granularity $G_i$ associated with beam i is chosen as $G_i=m_i k_{sub}$, wherein $m_i$ is the integer multiple associated with beam i. In some embodiments, the network node 14 may semi-statically configure the integer multiple values $\{m_i\}$ to a wireless device 16. In some further embodiments, the integer multiples $m_2, m_3, \ldots, m_{N_{SP}}$ may be RRC configured by the network node 14 to the wireless device 16 and the leading beam (i.e., beam i=1) is assumed to have a frequency-granularity of one subband.

In other, similar, embodiments, the frequency-granularity of each beam is selected to be either an integer multiple or a fractional multiple of the subband size. In other words, the multiplicity factor $m_i$ is allowed to be e.g. 0.5.

In some embodiments, the frequency-granularity of each beam is selected from a fixed set of possible values, for instance $G_i \in \{2, 6, 10, 25\}$ PRBs; and directly encoded with a number of bits.

In such embodiments, the granularity of each beam may be selected by the wireless device 16 and signaled to the network node 14 as part of the CSI report. In some such embodiments, the granularity selection may be semi-persistent so that the same granularity is used for a number of subsequent CSI reports in order to reduce feedback overhead. For instance, the beam frequency-granularities may be considered part of the $W_1$ report and be transmitted separately from the $W_2$ report.

In other such embodiments, the granularity is selected by the network node 14 and signaled to the wireless device 16 as for example part of a CSI report trigger contained in a DCI.

A motivation for using different frequency-granularities for different beams is now given. The beam components i are co-phased with the "leading beam" (i.e. beam i=1) in $$W_2 = \begin{bmatrix} 1 \\ e^{j\alpha_2} \\ \vdots \\ e^{j\alpha_{N_{SP}}} \end{bmatrix}.$$

Figure 16:
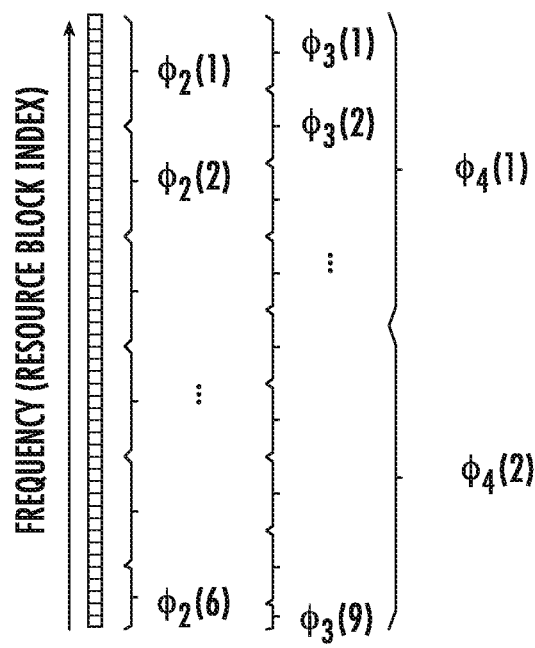
FIG. 16 illustrates different frequency granularities.

The optimal phase selection of a beam component i (for i>1), $\alpha_i(f)$, changes as a function of frequency f and will depend on the difference in average delay between beam i and the leading beam (i.e., beam 1). That is, if the average delay of the leading beam and beam i is similar, the phase $\alpha_i(f)$ may change rather slowly over frequency and thus $\alpha_i(f)$ may be reported with a coarser frequency-granularity. If, on the other hand, the difference in average delay is large between beam i and the leading beam, $\alpha_i(f)$ may be reported with a finer frequency-granularity. An illustration of this is given in FIG. 16 where the optimal phase selection of each beam as a function of frequency is shown.

In some embodiments, the wireless device 16 may select the leading beam (i.e., beam i=1) in such a way that it minimizes the frequency-selectivity of the phases of the other beams in the multi-beam precoder. This may for example be done by comparing the average delays $\bar{\tau}_i$ of each beam component and selecting the leading beam as the one that minimizes e.g., the squared difference of the average delays $\Sigma_i(\bar{\tau}_i-\bar{\tau}_1)^2$. By selecting the leading beam in such a way, the phases of the beams may be selected with a coarser frequency-granularity, resulting in a reduction in feedback overhead.

Figure 17:
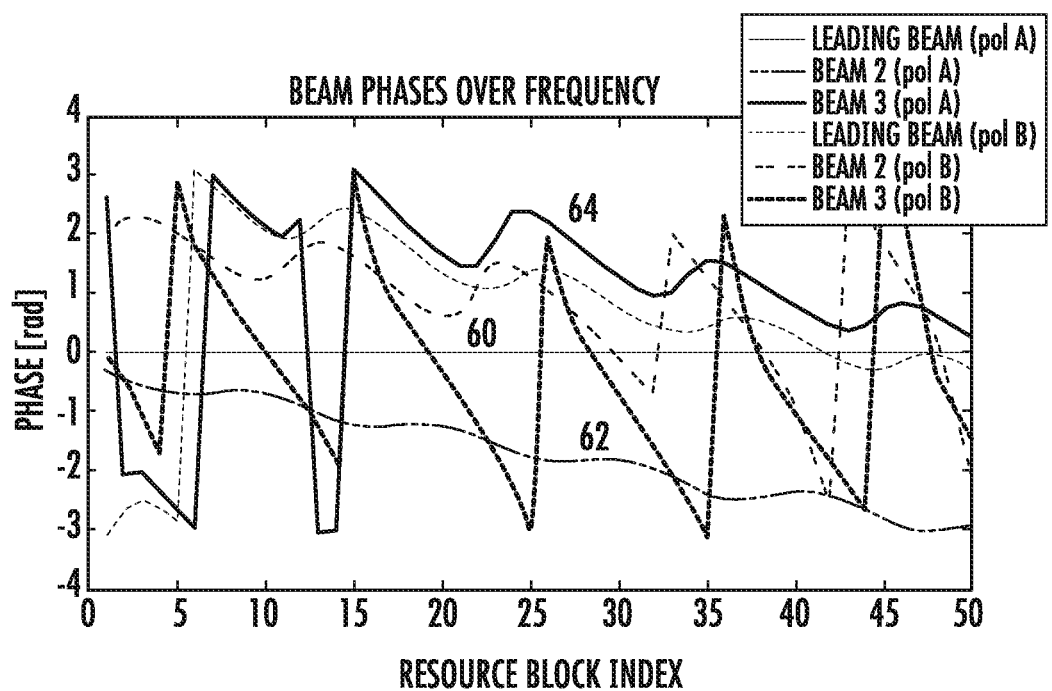
FIG. 17 is a plurality of graphs of beam phases.

In another set of embodiments, the phase of each beam component (as a function of frequency, "f"), is factorized into two components as $$e^{j\alpha_i(f)} = \phi_{avg,i}(f) \cdot \phi_{rem,i}\left(\left\lfloor \frac{f}{G_i} \right\rfloor\right)$$

where $\phi_{avg,i}(f)=e^{j(a+b \cdot f)}$ is a linear phase shift as a function of frequency that tries to capture the phase shift in frequency due to the difference in average delay of beam i compared to the leading beam, and $$\phi_{rem,i}\left(\left\lfloor \frac{f}{G_i} \right\rfloor\right)$$

is a remainder phase that is quantized with a certain frequency-granularity as per the earlier embodiments. The idea is that if one compensates for phase shift due to the average delay difference, the remainder phase may be quantized with a coarser frequency-granularity, and thus, the resulting overhead may be reduced. As a motivation for this embodiment, refer to, e.g., "Beam 3 (pol B)" in FIG. 17, where the phase varies rapidly with frequency but with an approximately linear rate. By factoring out the linear phase change due to the average delay, the remainder is less frequency-selective. In FIG. 17, graph 60 is the leading beam, graph 62 is the second beam and graph 64 is the third beam.

In some embodiments, the linear phase coefficient b is set based on an estimated average delay of the beams as $b=-2\pi(\bar{\tau}_i-\bar{\tau}_1)/N_{RB}$. In some embodiments, the linear phase coefficient a is "baked in" with $$\phi_{rem,i}\left(\left\lfloor \frac{f}{G_i} \right\rfloor\right)$$

and set to zero. In other embodiments, it is selected from a PSK alphabet $$a = \frac{2\pi k}{K},$$

k=0, 1, . . . K-1, for some value of K.

If the factorization of the average phase as a linear function of frequency in $\phi_{avg,i}(f)$ is "successful", the remainder phases $$\phi_{rem,i}\left(\left\lfloor \frac{f}{G_i} \right\rfloor\right)$$

may be close to one (i.e.

$$\phi_{rem,i}\left(\left\lfloor \frac{f}{G_i} \right\rfloor\right) \approx 1$$

or equivalently.

$$\angle \phi_{rem,i}\left(\left\lfloor \frac{f}{G_i} \right\rfloor\right) \approx 0).$$

It would then make sense to not quantize $$\phi_{rem,i}\left(\left\lfloor \frac{f}{G_i} \right\rfloor\right)$$

in the entire phase range of $[-\pi, +\pi]$ but instead quantize in a smaller range, for instance $$[-\frac{\pi}{2}, +\frac{\pi}{2}]$$

so that a higher level at detail can be captured with the same amount of overhead. Additionally or alternatively, the remainder phases $$\phi_{rem,i}\left(\left\lfloor \frac{f}{G_i} \right\rfloor\right)$$

may be quantized using non-uniform sampling, for instance Gaussian sampling, so that sampling is more dense around 0 radians than for larger phase values.

In another set of embodiments, different quantization granularity of each beam component i is used. For instance, the phases $e^{j\alpha_i}$ may be selected from a PSK alphabet as $$\alpha_i(k) = \frac{2\pi k}{K_i},$$

k=0, 1, . . . $K_i$-1, where the size of the PSK alphabet, $K_i$, is set separately for each beam component. Beam components with a lower selected power level $p_i$ in $W_1$ will to a lesser extent contribute to the overall precoding performance. Therefore, if one wishes to minimize to overall absolute quantization error, one may allow that the weaker beams have a larger relative quantization error than the stronger beams and thus assign less bits for phase quantization to the weaker beams (with small selected $p_i$) than the stronger beams (with large selected $p_i$).

Figure 18:
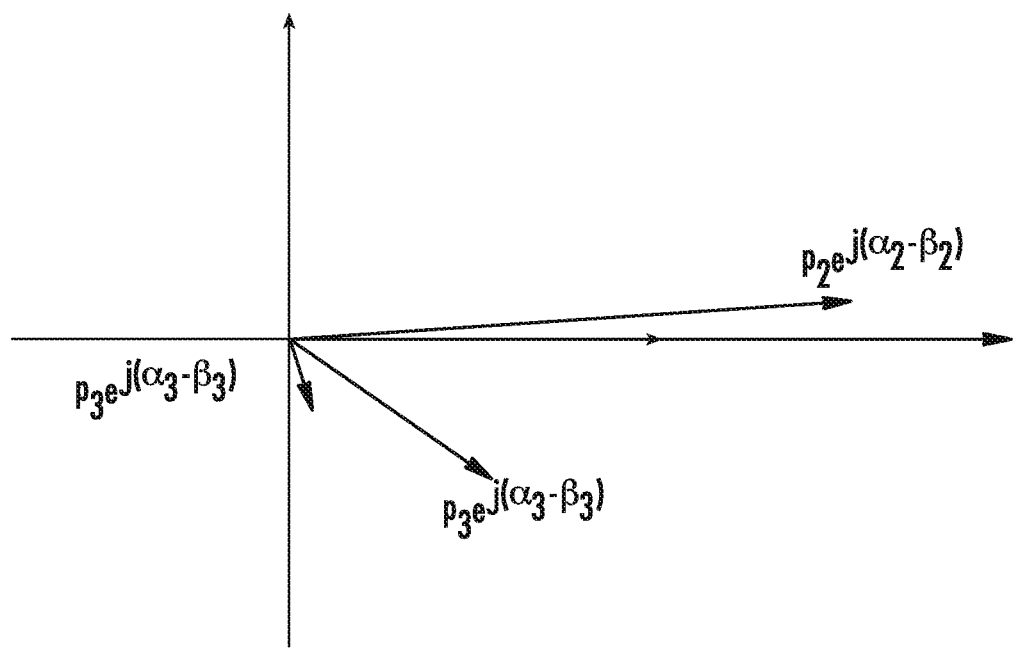
FIG. 18 illustrates a sum of vectors for determining phase error.

To illustrate this, the normalized received power from precoding with a multi-beam precoder may be approximated as $$\|HW\|^2 \approx C \cdot \|1 + \sum_{i=2}^{N_{SP}} p_i e^{j(\alpha_i - \beta_i)}\|^2,$$

where C is a normalization constant and $\beta_i$ is the actual channel phase of beam component i. The received power may thus be interpreted as the length of a sum of vectors, each with length $p_i$ and angle $e^{j(\alpha_i - \beta_i)}$ as is illustrated in FIG. 18. Thus, the phase error is magnified with the beam power $p_i$, so that a small phase error for a strong beam may have a larger impact than a larger phase error for a weak beam.

The size of the PSK alphabet used for each beam, $K_i$, and thus the number of bits assigned for phase quantization of the beam may depend solely on the beam power level $p_i$. In an exemplary embodiment, beams with $0.75 \le p_i \le 1$ uses $K_i = 8$ while beams with $0 \le p_i < 0.75$ use $K_i = 4$.

In a further embodiment, the network node 14 semi-statically configures a wireless device 16 (e.g., via RRC signaling) with two different PSK alphabet sizes $K_1$ and $K_2$, where $K_1 > K_2$. The wireless device 16 applies the PSK alphabet $K_1$ to beams with associated power levels that exceed a preconfigured power threshold $P_{Th}$ (That is, PSK alphabet $K_1$ is used for beams having associated power level $p_i > P_{Th}$). The wireless device 16 applies the PSK alphabet $K_2$ for beams with associated power levels below the power threshold $P_{Th}$.

Let $$W_2(f_i) = \begin{bmatrix} 1 \\ e^{j\alpha_2(f_i)} \\ \vdots \\ e^{j\alpha_{N_{SP}}(f_i)} \end{bmatrix}$$

be the $W_2$ on subband with frequency $f_i$ (i=1,2, ..., M), where M is the total number of subbands. Instead of quantizing and encoding the phase $\alpha_k(f_i)$, the phase differences between adjacent subbands, i.e. $\Delta\alpha_k(f_i) = \alpha_k(f_i) - \alpha_k(f_{i-1})$ (with $\Delta\alpha_k(f_1) = \alpha_k(f_1)$) may be encoded and fed back to the network node 14. Since the channel delay spread within each beam is relatively small, the phase change over frequency (or subbands) is also small. Therefore, $\Delta\alpha_k(f_i)$ may be encoded with less number of bits. An example is shown in Table 3, where 3 bits are used for encoding the phase of the first subband and 2 bits for rest of the subbands. Total 3+2(M−1) bits are needed in the example instead of 3M bits if 3 bits are used for phase encoding in each subband, a saving of M−2 bits or about 33% with M=6.

TABLE 3

| Subband index | Phase difference | Number of quantization bits (K) | Quantized phases |
|---|---|---|---|
| 1 | $\Delta\alpha_k(f_1) = \alpha_k(f_1)$ | 3 | $\frac{2\pi k}{K}$, (k = 0, 1, ..., K−1) |
| 2 | $\Delta\alpha_k(f_2) = \alpha_k(f_2) - \alpha_k(f_1)$ | 2 | $\left(-\frac{\pi}{2}, -\frac{\pi}{4}, 0, +\frac{\pi}{4}, +\frac{\pi}{2}\right)$ |
| ... | ... | ... | ... |
| M | $\Delta\alpha_k(f_M) = \alpha_k(f_M) - \alpha_k(f_{M-1})$ | 2 | $\left(-\frac{\pi}{2}, -\frac{\pi}{4}, 0, +\frac{\pi}{4}, +\frac{\pi}{2}\right)$ |

The phase $\alpha_k(f_i)$ of each subband can be restored at the network node 14 after receiving the feedback of $\{\Delta\alpha_k(f_i), i=1, 2, \ldots, M\}$ as follows:

$$\alpha_k(f_1) = \Delta\alpha_k(f_1)$$

$$\alpha_k(f_i) = \Delta\alpha_k(f_i) + \alpha_k(f_{i-1}), i=2, \ldots, M.$$

Figure 19:
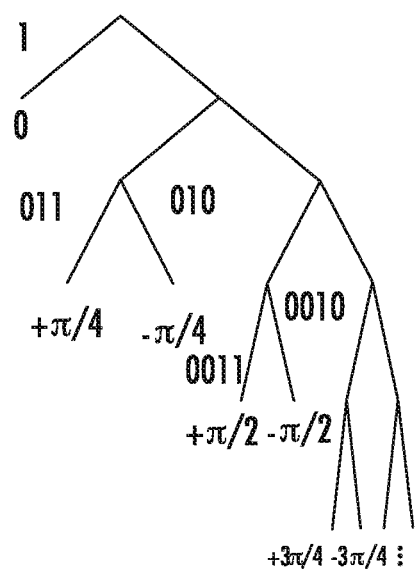
FIG. 19 illustrates a binary tree for encoding phase changes.

In another embodiment, the phase differences between adjacent subbands $\Delta\alpha_k(f_i) = \alpha_k(f_i) - \alpha_k(f_{i-1})$ are encoded with a variable length code, such as a Huffman code, so that small phase changes (that are more probable) are encoded with a small number of bits while larger, less likely, phase changes are encoded with a larger number of bits. An example of such a code is given in FIG. 19. FIG. 19, illustrated as a binary tree with the encoded value as leaves and the bit string representing it on the branches. As seen, a phase change of 0 radians is encoded with the bit string "1" while a phase change of $$-\frac{\pi}{2}$$

radians is encoded with "0010" and so forth. Thus, the encoding of the phase changes $$0, 0, \frac{\pi}{2}, 0, -\frac{\pi}{4}, 0, \frac{\pi}{4},$$

0 is done with the bit string "110011101010111", requiring 15 bits to encode 8 values. With this approach, the average number of bits required to encode the phase changes between subbands can be significantly reduced, if the phase varies slowly across frequency.

Principles of the disclosure may also be applied in the case where parametric phase encoding over frequency, as described above is used. That is, the phase $e^{j\alpha_i(f)}$ of each beam i is parametrically encoded over frequency as a polynomial phase function, i.e.

$$e^{j\alpha_i(f)} = e^{j\sum_{m=0}^{M_i} a_{m,i} f^m}.$$

Thus, in an embodiment of the disclosure, the order of the polynomial function $M_i$ for each beam may be set separately. For beams that illuminate a small number of multi-path components in the channel and thus likely experiences a low delay spread, a low polynomial order may be chosen, such as $M_i = 0$ or $M_i = 1$ corresponding to a constant phase function and linear phase function over frequency, respectively. The corresponding overhead for those beams is thus low since only 1 or 2 coefficients are needed to parametrize the phase change over frequency. For other beams that illuminate a larger number of multi-path components in the channel and thus likely experiences a larger delay spread, a higher polynomial order may be used, e.g. $M_i = 5$, requiring feedback of 6 polynomial coefficients.

The polynomial orders of the beams $M_0, M_1, \ldots$ may be decided by either the network node 14 or the wireless device 16 and may be signaled in a similar fashion as the embodiments discussed above.

Thus, some embodiments advantageously provide a method, wireless device and network node for determining a granularity for precoder overhead optimization. According to one aspect, a method in a wireless device 16 of determining a precoder from a multi-beam precoder codebook is provided. The method includes determining via the granularity determiner 20, for each beam, a granularity of a co-phasing factor, a granularity of a co-phasing factor for a beam being based on a beam strength, a weaker beam having a lower granularity than a stronger beam. The method also includes determining, via the co-phasing factor determiner 52, a co-phasing factor for each beam with the determined granularity. The method further includes transmitting, via the transceiver 48, co-phasing factors to a network node 14.

In some embodiments, the method further includes transmitting the granularities to the network node 14. In some embodiments, a granularity of a co-phasing factor for a beam is based on a beam strength, a weaker beam having a lower granularity than a stronger beam. In some embodiments, the method further includes determining, via the granularity determiner 20, a frequency granularity of each beam to be a multiple of a subband size. In some embodiments, the method further includes determining, via the granularity determiner 20, a granularity of a phase shift keyed, PSK, constellation. In some embodiments, the PSK constellation is 8 PSK for beams having a beam strength above a first threshold and is quadrature PSK (QPSK) for beams having a beam strength below a second threshold. In some embodiments, the first and second thresholds are the same. In some embodiments, the method further includes differentially encoding a phase of each a plurality of frequency subbands of a beam. In some embodiments, the method further includes comprising parametrically encoding a phase of a beam versus frequency of the beam.

In some embodiments, a wireless device 16 is configured to determine a precoder from a multi-beam precoder codebook. The wireless device 16 includes processing circuitry 42 including a memory 44 and a processor 46. The memory 44 is configured to store co-phasing factors. The processor 46 is configured to determine, for each beam, a granularity of a co-phasing factor, a granularity of a co-phasing factor for a beam being based on a beam strength, a weaker beam having a lower granularity than a stronger beam. The processor 46 is also configured to determine a co-phasing factor for each beam with the determined granularity. The wireless device 16 also includes a transceiver 48 configured to transmit the co-phasing factors to a network node 14.

In some embodiments, the processor 46 is further configured to transmit the determined granularities to the network node 14. In some embodiments, the processor 46 is further configured to determine a frequency granularity of each beam to be a multiple of a subband size.

In some embodiments, the processor 46 is further configured to determine a granularity of a phase shift keyed, PSK, constellation. In some embodiments, the PSK constellation is 8 PSK for beams having a beam strength above a first threshold and is quadrature PSK (QPSK) for beams having a beam strength below a second threshold. In some embodiments, the first and second thresholds are the same. In some embodiments, the processor 46 is further configured to differentially encode a phase of each of a plurality of frequency subbands of a beam.

In some embodiments, a wireless device 16 is configured to determine a precoder from a multi-beam precoder codebook. The wireless device 16 includes a memory module 45 configured to store co-phasing factors, a granularity determiner module 21 configured to determine, for each beam, a granularity of a co-phasing factor, a granularity of a co-phasing factor for a beam being based on a beam strength, a weaker beam having a lower granularity than a stronger beam. The wireless device 16 also includes a co-phasing factor determiner module 53 configured to determine a co-phasing factor for each beam with the determined granularity. The wireless device 16 also includes a transceiver module 49 configured to transmit the co-phasing factors to a network node 14.

In some embodiments, a method for a wireless device 16 of reporting a precoder to a network node 14 is provided. The method includes determining from a codebook an indication of a precoder comprising a first beam phase parameter and a second beam phase parameter corresponding to a first beam and second beam, respectively. The first beam phase parameter takes on one of a first integer number of phase values and corresponds to a first frequency-granularity S112. The second beam phase parameter takes on one of a second integer number of phase values and corresponds to a second frequency-granularity. Further, at least one of the following conditions applies: the second integer number of phase values is less than the first number of phase values, and the second frequency-granularity is greater than the first frequency-granularity. The method includes determined indication of the precoder transmitting the determined indication of the precoder to the network node. In some embodiments, the second beam has a lesser power than the first beam S114.

In some embodiments, a method for a wireless device 16 of reporting a precoder to a network node 14 is provided. The method includes determining from a codebook a precoder comprising a first beam phase parameter and a second beam phase parameter corresponding to a first beam and second beam, respectively S112. The first beam phase parameter takes on one of a first integer number of phase values. The second beam phase parameter takes on one of a second integer number of phase values. The second beam has a lesser power than the first beam and the second integer number of phase values is less than the first integer number of phase values. The method also includes reporting the selected precoder to a network node S114.

In some embodiments, the method also includes determining the first and second integer number of phase values, and, optionally, transmitting the first and second integer number of phase values to the network node. In some embodiments, the method also includes determining a frequency-granularity of each beam to be a multiple of a subband size. In some embodiments, the first and second integer number of phase values are respective number of values attainable in a phase shift keyed, PSK, constellation. In some embodiments, each of the first and second beams is a $k^{th}$ beam, d(k), that has associated a set of complex numbers and has index pair $(l_k, m_k)$, each element of the set of complex numbers being characterized by at least one complex phase shift such that:

$$d_n(k) = d_i(k)\alpha_{i,n} e^{j2\pi(p\Delta_{1,k} + q\Delta_{2,k})};$$

$d_n(k)$, and $d_i(k)$ are the $i^{th}$ and $n^{th}$ elements of d(k), respectively;

$\alpha_{i,n}$ is a real number corresponding to the $i^{th}$ and $n^{th}$ elements of d(k);

p and q are integers; and beam directions $\Delta_{1,k}$ and $\Delta_{2,k}$ are real numbers corresponding to beams with index pair $(l_k, m_k)$ that determine complex phase shifts $e^{j2\pi\Delta_{1,k}}$ and $e^{j2\pi\Delta_{2,k}}$ respectively; and each of the first and second beam phase parameters is a complex coefficient $c_k$ for d(k) used to adjust at least the phase of the $i^{th}$ element of d(k) according to $c_k d_i(k)$.

In some embodiments, the first and second integer number of phase values are respective granularities of respective co-phasing factors for the first and second beams. In some embodiments, the PSK constellation is 8 PSK for beams having a beam strength above a first threshold and the PSK constellation is quadrature PSK (QPSK) for beams having a beam strength below a second threshold. In some embodiments, the first and second thresholds are the same. In some embodiments, the method further includes differentially encoding at least one of the first and second beam phase parameters, wherein each of the first and second beam phase parameters corresponds to a plurality of frequency subbands. In some embodiments, a first plurality of first beam phase parameters and a second plurality of second beam phase parameters correspond to the first beam and second beam, respectively. Further the method may include parametrically encoding at least one of the first plurality and second plurality of first and second beam phase parameters, where the at least one of the first plurality and second plurality of beam phase parameters are coefficients within a predetermined function over frequency.

In some embodiments, a wireless device 16 is configured to transmit a precoder to a network node 14. The wireless device 16 includes processing circuitry 62 including a memory 64 and a processor 66. In some embodiments, the memory 64 is configured to store beam phase parameters. The processor 66 is configured to determine from a codebook an indication of a precoder comprising a first beam phase parameter and a second beam phase parameter corresponding to a first beam and second beam, respectively. The first beam phase parameter takes on one of a first integer number of phase values and corresponds to a first frequency-granularity. The second beam phase parameter takes on one of a second integer number of phase values and corresponds to a second frequency-granularity, where at least one of the following conditions apply: the second integer number of phase values is less than the first number of phase values, and the second frequency-granularity is greater than the first frequency-granularity. The wireless device 16 also includes a transceiver 68 configured to transmit the determined indication of the precoder to the network node. In some embodiments, the second beam has a lesser power than the first beam.

In some embodiments, a wireless device 16 is configured to transmit a precoder to a network node 14. The wireless device 16 includes processing circuitry 62 including a memory 64 and a processor 66. The memory 64 is configured to store beam phase parameters. The processor 66 is configured to implement a beam phase parameter determiner 72 to determine from a codebook an indication of a precoder comprising a first beam phase parameter and a second beam phase parameter corresponding to a first beam and second beam, respectively. The first beam phase parameter takes on one of a first integer number of phase values. The second beam phase parameter takes on one of a second integer number of phase values, the second beam having a lesser power than the first beam and the second integer number of phase values being less than the first integer number of phase values. The wireless device 16 also includes a transceiver 68 configured to transmit the selected precoder to a network node 14.

In some embodiments, the processor 66 is further configured to determine the first and second integer number of phase values, and transmitting the first and second integer number of phase values to the network node. In some embodiments, the processor 66 is further configured to determine a frequency-granularity of each beam to be a multiple of a subband size.

In some embodiments, the first and second integer number of phase values are respective number of values attainable in a phase shift keyed, PSK, constellation. In some embodiments, each of the first and second beams is a $k^{th}$ beam, d(k), that has associated a set of complex numbers and has index pair $(l_k, m_k)$, each element of the set of complex numbers being characterized by at least one complex phase shift such that:

$$d_n(k)=d_i(k)\alpha_{i,n}e^{j2\pi(p\Delta_{1,k}+q\Delta_{2,k})};$$

$d_n(k)$, and $d_i(k)$ are the $i^{th}$ and $n^{th}$ elements of d(k), respectively;

$\alpha_{i,n}$ is a real number corresponding to the $i^{th}$ and $n^{th}$ elements of d(k);

p and q are integers; and beam directions $\Delta_{1,k}$ and $\Delta_{2,k}$ are real numbers corresponding to beams with index pair $(l_k, m_k)$ that determine complex phase shifts $e^{j2\pi\Delta_{1,k}}$ and $e^{j2\pi\Delta_{2,k}}$ respectively; and each of the first and second beam phase parameters is a complex coefficient $c_k$ for d(k) used to adjust at least the phase of the $i^{th}$ element of d(k) according to $c_k d_i(k)$.

In some embodiments, the first and second integer number of phase values are respective granularities of respective co-phasing factors for the first and second beams. In some embodiments, the PSK constellation is 8 PSK for beams having a beam strength above a first threshold and the PSK constellation is quadrature PSK (QPSK) for beams having a beam strength below a second threshold. In some embodiments, the first and second thresholds are the same. In some embodiments, the processor 66 is further configured to differentially encode at least one of the first and second beam phase parameters, wherein each of the first and second beam phase parameters corresponds to a plurality of frequency subbands. In some embodiments, a first plurality of first beam phase parameters and a second plurality of second beam phase parameters correspond to the first beam and second beam, respectively. The processor 66 is further configured to parametrically encode at least one of the first plurality and second plurality of first and second beam phase parameters, where the at least one of the first plurality and second plurality of beam phase parameters are coefficients within a predetermined function over frequency.

In some embodiments, a wireless device 16 includes a memory module 65 configured to store beam phase parameters 70. The wireless device 16 also includes a beam phase determiner module 73 configured to determine first and second beam phase parameters corresponding to first and second beams, respectively. The first beam phase parameter takes on one of a first integer number of phase values. The second beam phase parameter taking on one of a second integer number of phase values, the second beam having a lesser power than the first beam and the second integer number of phase values being less than the first integer number of phase values. The wireless device 16 also includes a transceiver module 69 configured to transmit the selected precoder to a network node 14.

In some embodiments, a method in a network node 14 for determining a precoder using a multi-beam precoder codebook is provided. The method includes receiving via the transceiver 28, a first co-phasing factor determined for a first beam with a first frequency granularity, receiving a second co-phasing factor determined for a second beam with a second frequency granularity, the second frequency granularity being greater than the first frequency granularity, and determining a precoder 34 using the first and second co-phasing factors.

In some embodiments, the method includes determining, via a granularity determiner 18, a frequency granularity of a co-phasing factor for each of a plurality of beams, a frequency granularity of a co-phasing factor for a beam being based on a beam strength, a weaker beam having a lower frequency granularity than a stronger beam, and transmitting the frequency granularities to the wireless device 16. According to this aspect, in some embodiments, a frequency granularity of a co-phasing factor for a beam is based on a beam strength, a weaker beam having a lower granularity than a stronger beam. In some embodiments, the method includes determining, via the granularity determiner 18, a frequency granularity of each beam to be a multiple of a subband size. In some embodiments, the method further includes determining, via the granularity determiner 18, a frequency granularity of a phase shift keyed, PSK, constellation. In some embodiments, the PSK constellation is 8 PSK for beams having a beam strength above a threshold and is quadrature PSK (QPSK) for beams having a beam strength below the threshold.

In some embodiments, a network node 14 for determining a precoder using a multi-beam precoder codebook is provided. The network node 14 includes processing circuitry 22 including a memory 24 and a processor 26. The memory 24 is configured to store co-phasing factors for each of a plurality of beams. The processor 26 is configured to receive a first co-phasing factor determined for a first beam with a first frequency granularity and receive a second co-phasing factor determined for a second beam with a second frequency granularity, the second frequency granularity being greater than the first frequency granularity. The processor 26 is further configured to determine a precoder using the first and second co-phasing factors.

In some embodiments, the processor 26 is configured to determine a granularity of a co-phasing factor for each of a plurality of beams, a frequency granularity of a co-phasing factor for a beam being based on a beam strength, a weaker beam having a lower frequency granularity than a stronger beam, and. The network node 14 further includes a transceiver 28 configured to transmit the frequency granularities to a wireless device 16. According to this aspect, in some embodiments, the processor 26 is further configured to determine a frequency granularity of each beam to be a multiple of a subband size. In some embodiments, the processor 26 is further configured to determine a granularity of a phase shift keyed, PSK, constellation. In some embodiments, the PSK constellation is 8 PSK for beams having a beam strength above a threshold and is quadrature PSK (QPSK) for beams having a beam strength below the threshold. In some embodiments, the processor 26 is further configured to differentially encode a phase of each subband.

In some embodiments, a network node 14 is configured to determine a precoder using a multi-beam precoder codebook. The network node 14 includes a transceiver module 29 configured to receive a first co-phasing factor determined for a first beam with a first granularity and receive a second co-phasing factor determined for a second beam with a second granularity, the second granularity being greater than the first granularity. The network node 14 further includes a precoder module 35 configured to determine a precoder using the first and second co-phasing factors Some embodiments include:

Embodiment 1

A method of determining a precoder from a multi-beam precoder codebook, the method comprising:
determining, for each beam, a granularity of a co-phasing factor;
determining a co-phasing factor for each beam with the determined granularity; and
transmitting the granularities and co-phasing factors to a network node.

Embodiment 2

The method of Embodiment 1, wherein a granularity of a co-phasing factor for a beam is based on a beam strength, a weaker beam having a lower granularity than a stronger beam.

Embodiment 3

The method of Embodiment 1, further comprising determining a frequency granularity of each beam to be a multiple of a subband size.

Embodiment 4

The method of Embodiment 1, further comprising determining a granularity of a phase shift keyed, PSK, constellation.

Embodiment 5

The method of Embodiment 1, further comprising differentially encoding a phase of each subband.

Embodiment 6

A wireless device configured to determine a precoder from a multi-beam precoder codebook, the wireless device comprising:
processing circuitry including a memory and a processor;
the memory configured to store co-phasing factors; and
the processor configured to:
determine, for each beam, a granularity of a co-phasing factor; and
determine a co-phasing factor for each beam with the determined granularity; and
a transceiver configured to transmit the granularities and co-phasing factors to a network node.

Embodiment 7

The wireless device of Embodiment 6, wherein a granularity of a co-phasing factor for a beam is based on a beam strength, a weaker beam having a lower granularity than a stronger beam.

Embodiment 8

The wireless device of Embodiment 6, further comprising determining a frequency granularity of each beam to be a multiple of a subband size.

Embodiment 9

The wireless device of Embodiment 6, further comprising determining a granularity of a phase shift keyed, PSK, constellation.

Embodiment 10

The wireless device of Embodiment 6, further comprising differentially encoding a phase of each subband.

Embodiment 11

A wireless device configured to determine a precoder from a multi-beam precoder codebook, the wireless device comprising:
 a memory module configured to store co-phasing factors;
 a granularity determiner module configured to determine, for each beam, a granularity of a co-phasing factor; and
 a co-phase factor determiner module configured to determine a co-phasing factor for each beam with the determined granularity; and
 a transceiver module configured to transmit the granularities and co-phasing factors to a network node.

Embodiment 12

A method of configuring a wireless device via a network node, the method comprising:
 determining a granularity of a co-phasing factor for each of a plurality of beams; and
 transmitting the granularities to the wireless device.

Embodiment 13

The method of Embodiment 12, wherein a granularity of a co-phasing factor for a beam is based on a beam strength, a weaker beam having a lower granularity than a stronger beam.

Embodiment 14

The method of Embodiment 12, further comprising determining a frequency granularity of each beam to be a multiple of a subband size.

Embodiment 15

The method of Embodiment 12, further comprising determining a granularity of a phase shift keyed, PSK, constellation.

Embodiment 16

The method of Embodiment 12, further comprising differentially encoding a phase of each subband.

Embodiment 17

A network node configured to determine a configuration of a wireless device, the network node comprising:
 processing circuitry including a memory and a processor:
  the memory configured to store a granularity of a co-phasing factor for each of a plurality of beams; and
  the processor configured to determine a granularity of a co-phasing factor for each of a plurality of beams; and
 a transceiver configured to transmit the granularities to a wireless device.

Embodiment 18

The network node of Embodiment 17, wherein a granularity of a co-phasing factor for a beam is based on a beam strength, a weaker beam having a lower granularity than a stronger beam.

Embodiment 19

The network node of Embodiment 17, further comprising determining a frequency granularity of each beam to be a multiple of a subband size.

Embodiment 20

The network node of Embodiment 17, further comprising determining a granularity of a phase shift keyed, PSK, constellation.

Embodiment 21

The network node of Embodiment 17, further comprising differentially encoding a phase of each subband.

Embodiment 22

A network node configured to determine a configuration of a wireless device, the network node comprising:
 a memory module configured to store a granularity of a co-phasing factor for each of a plurality of beams;
 a granularity determiner module configured to determine a granularity of a co-phasing factor for each of a plurality of beams; and
 a transceiver module configured to transmit the granularities to a wireless device.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations used in the preceding description include:
1D One dimensional
2D Two-Dimensional
3GPP Third Generation Partnership Project
5G Fifth Generation
ACK Acknowledgement
ASIC Application Specific Integrated Circuit
ARQ Automatic Retransmission Request
CA Carrier Aggregation
CB Codebook
CDMA Code Division Multiple Access
CFAI CSI Feedback Accuracy Indicator
CFI Control Information Indicator
CP Cyclic Prefix
CPU Central Processing Unit
CQI Channel Quality Indicators
CRS Common Reference Symbol/Signal
CSI Channel State Information
CSI-RS Channel State Information Reference Symbol/Signal
dB Decibel
DCI Downlink Control Information
DFT Discrete Fourier Transform
DL Downlink
eNB Enhanced or Evolved Node B
DP Dual Polarization
EPC Evolved Packet Core
EPDCCH Enhanced Physical Downlink Control Channel
EPRE Energy per Resource Element
E-UTRAN Evolved or Enhanced Universal Terrestrial Radio Access Network
FDD Frequency Division Duplexing
FD-MIMO Full Dimension MIMO
FFT Fast Fourier Transform
FPGA Field Programmable Gate Array
GSM Global System for Mobile Communications
HARQ Hybrid ARQ
ID Identifier
IFFT Inverse FFT
LSB Least Significant Bit
LTE Long Term Evolution
M2M Machine-to-Machine
MCS Modulation and Coding Scheme (or State)
MIMO Multiple Input Multiple Output
MME Mobility Management Entity
MSB Most Significant Bit
MU-MIMO Multi-User MIMO
NAK Non-Acknowledgement
NZP Non-Zero Power
OCC Orthogonal Cover Code
OFDM Orthogonal Frequency Division Multiplexing
PCFICH Physical Control Format Indicator Channel
PDA Personal Data Assistance
PDCCH Physical Downlink Control Channel
PDSCH Physical Downlink Shared Channel
PRB Physical Resource Block
PMI Precoder Matrix Indicator
PSK Phase Shift Keying
PUCCH Physical Uplink Control Channel
PUSCH Physical Uplink Shared Channel
QPSK Quadrature Phase Shift Keying
RB Resource Block
RE Resource Element
Rel Release
RI Rank Indicator
RRC Radio Resource Control
SINR Signal to Interference plus Noise Ratio
SNR Signal to Noise Ratio
SP Single Polarization
SR Scheduling Request
SU-MIMO Single User MIMO
TDD Time Division Duplexing
TFRE Time/Frequency Resource Element
TP Transmission Point
TS Technical Specification
Tx Transmit
UE User Equipment
UL Uplink
ULA Uniform Linear Array
UMB Ultra Mobile Broadband
UPA Uniform Planar Array
WCDMA Wideband Code Division Multiple Access
ZP Zero Power It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for a user equipment to transmit an indication of a precoder to a base station, the method comprising:
  determining from a codebook an indication of a precoder comprising a first beam phase parameter and a second beam phase parameter corresponding to a first beam and second beam, respectively;
    the first beam phase parameter taking on one of a first integer number of phase values, the first integer number is 8;
    the second beam phase parameter taking on one of a second integer number of phase values, the second integer number is 4, the second beam having a lesser power than the first beam; and
  reporting the determined indication of the precoder to a base station.

2. The method of claim 1, further comprising determining the first and second integer number of phase values, and, optionally, transmitting the first and second integer number of phase values to the base station;
  the first integer number of phase values being based on a power of the first beam; and
  the second integer number of phase values being based on a power of the second beam.

3. The method of claim 1, further comprising determining a frequency-granularity of each beam to be a multiple of a subband size.

4. The method of claim 1, wherein the first and second integer number of phase values are respective numbers of values attainable in a phase shift keyed, PSK, constellation.

5. The method of claim 4, wherein the PSK constellation is 8 PSK for beams having a beam strength above a first threshold and the PSK constellation is quadrature PSK (QPSK) for beams having a beam strength below a second threshold.

6. The method of claim 5, wherein the first and second thresholds are the same.

7. The method of claim 1, wherein each of the first and second beams is a $k^{th}$ beam, $d(k)$, that has associated a set of complex numbers and has index pair $(l_k, m_k)$, each element of the set of complex numbers being characterized by at least one complex phase shift such that:

$$d_n(k) = d_i(k)\alpha_{i,n} e^{j2\pi(p\Delta_{1,k} + q\Delta_{2,k})};$$

$d_n(k)$, and $d_i(k)$ are the $i^{th}$ and $n^{th}$ elements of $d(k)$, respectively;
  $\alpha_{i,n}$ is a real number corresponding to the $i^{th}$ and $n^{th}$ elements of $d(k)$;
  p and q are integers; and
  beam directions $\Delta_{1,k}$ and $\Delta_{2,k}$ are real numbers corresponding to beams with index pair $(l_k, m_k)$ that determine complex phase shifts $e^{j2\pi\Delta_{1,k}}$ and $e^{j2\pi\Delta_{2,k}}$ respectively; and
  each of the first and second beam phase parameters is a complex coefficient $c_k$ for $d(k)$ used to adjust at least the phase of the $i^{th}$ element of $d(k)$ according to $c_k d_i(k)$.

8. The method of claim 1, wherein the first and second integer number of phase values are respective granularities of respective co-phasing factors for the first and second beams, a co-phasing factor for a beam corresponding to a factor associated with one of a plurality of polarizations on which the beam is transmitted.

9. The method of claim 1, further comprising differentially encoding at least one of the first and second beam phase parameters.

10. The method of claim 1, wherein a first plurality of first beam phase parameters and a second plurality of second beam phase parameters correspond to the first beam and second beam, respectively, and further comprising parametrically encoding at least one of the first plurality and second plurality of first and second beam phase parameters, wherein the at least one of the first plurality and second plurality of beam phase parameters are coefficients within a predetermined function over frequency.

11. The method of claim 1, wherein each of the first and second beam phase parameters correspond to a frequency subband from a plurality of frequency subbands.

12. A user equipment configured to transmit an indication of a precoder to a base station, the method comprising:
  processing circuitry configured to:
    determine from a codebook an indication of a precoder comprising a first beam phase parameter and a second beam phase parameter corresponding to a first beam and second beam, respectively;
      the first beam phase parameter taking on one of a first integer number of phase values, the first integer number is 8; and
      the second beam phase parameter taking on one of a second integer number of phase values, the second integer number is 4, the second beam having a lesser power than the first beam; and
  a transceiver configured to transmit the determined indication of the precoder to a base station.

13. The user equipment of claim 12, further comprising determining the first and second integer number of phase values, and, optionally, transmitting the first and second integer number of phase values to the base station;
  the first integer number of phase values being based on a power of the first beam; and
  the second integer number of phase values being based on a power of the second beam.

14. The user equipment of claim 12, wherein each of the first and second beam phase parameters correspond to a frequency subband from a plurality of frequency subbands.

15. A base station for receiving an indication of a precoder from a user equipment, the method comprising:
  processing circuitry configured to:
    receive an indication of a precoder comprising a first beam phase parameter and a second beam phase parameter corresponding to a first beam and second beam, respectively;
      the first beam phase parameter taking on one of a first integer number of phase values, the first integer number is 8; and
      the second beam phase parameter taking on one of a second integer number of phase values, the second integer number is 4, the second beam having a lesser power than the first beam and the second integer number of phase values being less than the first integer number of phase values;
    determine a precoder based on the received indication of the precoder; and
    generate the first and second beams based on the precoder.

16. The base station of claim 15, further comprising receiving the first and second integer number of phase values.

17. The base station of claim 15, wherein a frequency-granularity of each beam is determined to be a multiple of a subband size.

18. The base station of claim 15, wherein the first and second integer number of phase values are respective numbers of values attainable in a phase shift keyed, PSK, constellation.

19. The base station of claim 18, wherein the PSK constellation is 8 PSK for beams having a beam strength above a first threshold and the PSK constellation is quadrature PSK (QPSK) for beams having a beam strength below a second threshold.

20. The base station of claim 19, wherein the first and second thresholds are the same.

21. The base station of claim 15, wherein each of the first and second beams is a $k^{th}$ beam, $d(k)$, that has associated a set of complex numbers and has index pair $(l_k, m_k)$, each element of the set of complex numbers being characterized by at least one complex phase shift such that:

$$d_n(k) = d_i(k)\alpha_{i,n}e^{j2\pi(p\Delta_{1,k}+q\Delta_{2,k})};$$

$d_n(k)$, and $d_i(k)$ are the $i^{th}$ and $n^{th}$ elements of $d(k)$, respectively;

$\alpha_{i,n}$ is a real number corresponding to the $i^{th}$ and $n^{th}$ elements of $d(k)$;

p and q are integers; and beam directions $\Delta_{1,k}$ and $\Delta_{2,k}$ are real numbers corresponding to beams with index pair $(l_k, m_k)$ that determine complex phase shifts $e^{j2\pi\Delta_{1,k}}$ and $e^{j2\pi\Delta_{2,k}}$ respectively; and each of the first and second beam phase parameters is a complex coefficient $c_k$ for $d(k)$ used to adjust at least the phase of the $i^{th}$ element of $d(k)$ according to $c_k d_i(k)$.

22. The base station of claim 15, wherein the first and second integer number of phase values are respective granularities of respective co-phasing factors for the first and second beams, a co-phasing factor for a beam corresponding to a factor associated with one of a plurality of polarizations on which the beam is transmitted.

23. The base station of claim 15, wherein each of the first and second beam phase parameters correspond to a frequency subband from a plurality of frequency subbands.

* * * * *